United States Patent
Zhang et al.

(10) Patent No.: US 12,444,016 B2
(45) Date of Patent: Oct. 14, 2025

(54) FOCUS OF SHARED CONTENT

(71) Applicant: Citrix Systems, Inc., Fort Lauderdale, FL (US)

(72) Inventors: Hui Zhang, Nanjing Jiangsu (CN); Liang Zhou, Nanjing Jiangsu (CN); Yuan Ren, Nanjing Jiangsu (CN)

( * ) Notice: Subject to any disclaimer, the term of this patent is extended or adjusted under 35 U.S.C. 154(b) by 730 days.

(21) Appl. No.: 17/579,003

(22) Filed: Jan. 19, 2022

(65) Prior Publication Data
US 2023/0214958 A1 Jul. 6, 2023

Related U.S. Application Data

(63) Continuation of application No. PCT/CN2022/070385, filed on Jan. 5, 2022.

(51) Int. Cl.
*G06T 3/40* (2024.01)
*G06F 3/14* (2006.01)

(52) U.S. Cl.
CPC .............. *G06T 3/40* (2013.01); *G06F 3/1454* (2013.01)

(58) Field of Classification Search
None
See application file for complete search history.

(56) References Cited

U.S. PATENT DOCUMENTS

| | | | |
|---|---|---|---|
| 2016/0232647 A1* | 8/2016 | Carlos | G06F 3/0481 |
| 2023/0120371 A1* | 4/2023 | Agrawal | G06V 40/107 |
| | | | 348/14.07 |

* cited by examiner

*Primary Examiner* — Yanna Wu

(57) ABSTRACT

Methods and systems for allowing for techniques of automatically targeting focus and enlarging images upon detection that a receiver of shared video content is using a smaller screen. The presenter may indicate a focus point on the displayed video being shared to indicate where the targeted focusing and enlarging should be centered. A focus area and an enlargement factor may be calculated based on a difference in screen size between a presenter device and a destination device. The focus area and enlargement factor may be calculated such that elements of the shared video content are substantially the same size to a viewer of the destination device as they appear to the presenter on their presenter device. Different destination devices may have different focus areas and enlargement factors.

11 Claims, 15 Drawing Sheets

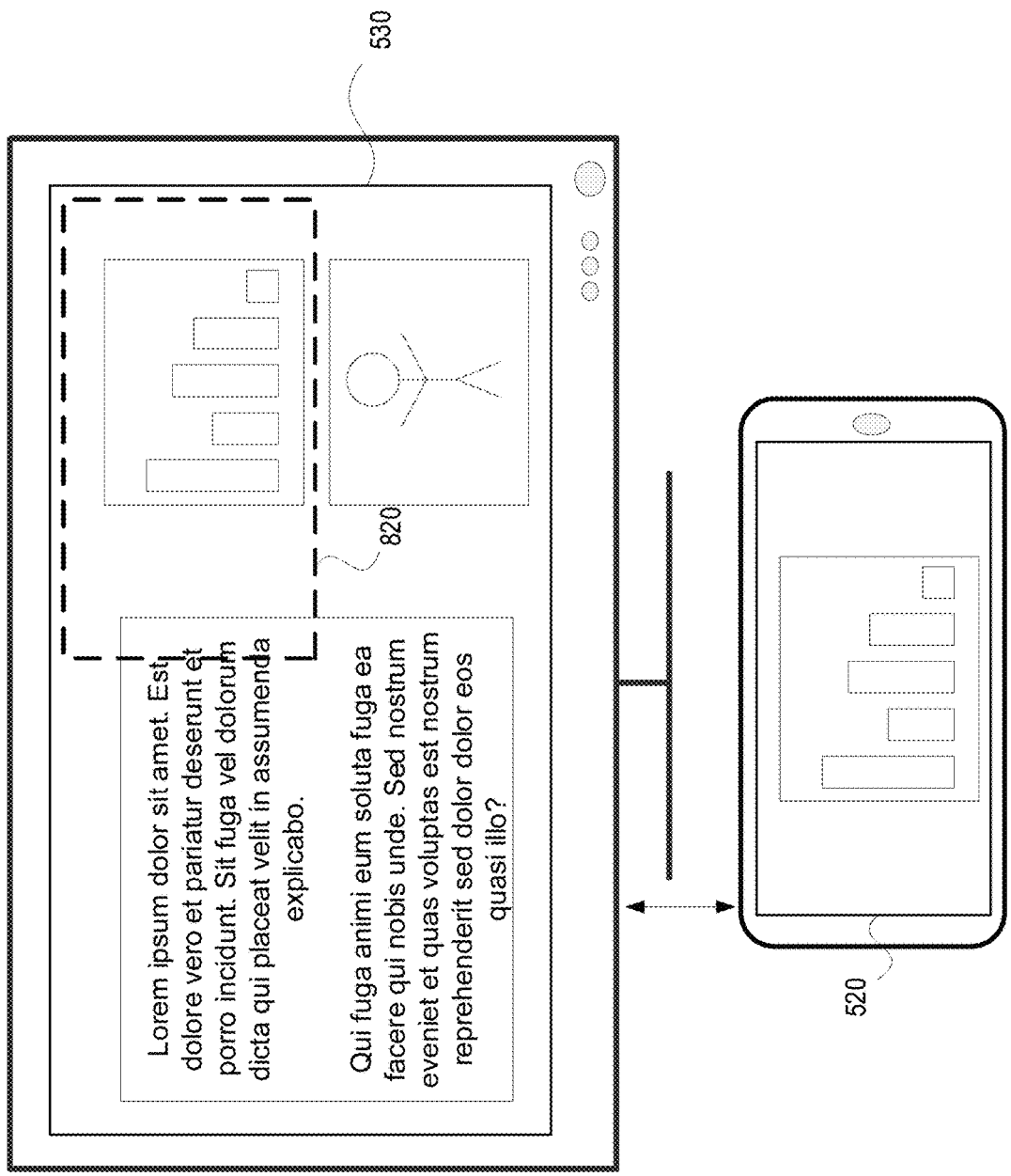

FOCUS OF SHARED CONTENT

CROSS-REFERENCE TO RELATED APPLICATIONS

The present application claims priority to International Application No. PCT/CN2022/070385, filed Jan. 5, 2022, and entitled "Focus of Shared Content," which is hereby incorporated by reference as to its entirety.

FIELD

Aspects described herein generally relate to computer networking and hardware and software related thereto. More specifically, one or more aspects described herein provide for techniques of improved sharing of screen content.

BACKGROUND

Video conferencing tools particularly for communications incorporating both audio and visual elements are increasing in use for both personal and businesses meetings. Often, screen sharing is used during meetings where one party is able to share a document, an application, or their entire screen with one or more other participants attending the video conference.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Video conferencing tools attempt to bridge the gap between in person meetings and telephonic conferences. Screen sharing is a practical function provided by many video conferencing tools to increase efficiency and better simulate in person meetings. Screen sharing, as well as the related functions of window sharing and/or application sharing, may be helpful for a speaker presenting or demonstrating for an audience. When an audience or other participants in a video conference have the same or similar sized displays to the presenter, sharing the screen may work well. However, when other participants are using displays of smaller sizes, sharing the entire screen, window, or application may be problematic. The participants with smaller displays may not be able to see or experience the shared content in a sufficiently useful manner. For example, a document with text may be legible on the screen of the presenter, but is unreadable or illegible on the screen of a participant joining the video conference on a mobile device with a smaller screen. Since the same amount of text is being displayed on the mobile device with a smaller screen, the text itself must be displayed much smaller resulting in the unreadability or illegibility.

The ability to manually zoom on the smaller display may only provide an inconsistent and inefficient solution. Each of many viewers of a presentation, for example, may have to constantly be manually adjusting and may be hindered by the illegibility of what is on the screen from selecting the appropriate content efficiently.

To overcome these limitations, and to overcome other limitations that will be apparent upon reading and understanding the present specification, aspects described herein are directed towards techniques of automatically targeting focus and enlarging images upon detection that a receiver of shared video content is using a smaller screen.

In some examples, a computing device may determine that a device of a plurality of remote devices includes a display smaller in size than another device of the plurality based on a comparison of display sizes among the plurality of remote devices. The device may receive and display content shared from the another device. The computing device may receive an indication from the another device. The indication may identify a relevant portion of content and size in which to display on the device content shared from the another device. The computing device may adjust the content for the another device based on an area of focus and a size as per the indication. The computing device may provide the adjusted content to the device so that the device displays a relevant portion of the content with a size capable of being read by a user of the device.

In some examples, the computing device may further calculate a focus point of the content, wherein the focus point is used as a center of the area of focus of the content. The computing device may further calculate a focus area of the content. The computing device may further calculate an enlargement factor. The computing device may further adjust the focus point of the content to avoid the focus area exceeding a boundary of the content. The computing device may further calculate a boundary window based on the enlargement factor, wherein a center of the boundary window is a center of the displayed version of the content. The computing device may further detect that the focus point is outside the boundary window. The computing device may further adjust the focus point by mapping it to a closest point on the boundary window.

In some examples, the computing device may determine that a second device of the plurality of remote devices includes a display smaller in size than the another device of the plurality based on a second comparison of display sizes among the plurality of remote devices. The determined second device may also receive and display content shared from the another device. The display size of the second device may be different than the display size of the another device. The computing device may adjust the content for the second device based on an area of focus and the size as per the indication. The computing device may provide the adjusted content for the second device to the second device so that the second device displays the relevant portion of the content with a size capable of being read by a user of the second device.

In some examples, the computing device may generate simulated view video data of what is displayed on the device. The computing device may send the simulated view video data to the another device. In some examples, the enlargement factor and the focus area may be calculated such that elements displayed on the device are substantially a same size as same elements displayed in an equivalent of the focus area of the device.

In some examples, the computing device may receive a shared video data stream from a presenter device. The computing device may receive an indication of interaction with a displayed version of the shared video data stream on the presenter device. The computing device may receive a screen size of the presenter device. The computing device may receive a screen size of a destination device. The computing device may determine a screen size of the destination device is smaller than the screen size of the presenter device. The computing device may calculate an enlargement factor based on the screen sizes. The computing device may calculate a focus area of the shared video data stream based on the indication of interaction and the enlargement factor. The computing device may adjust the shared video data stream for display on the destination device based on the focus area and enlargement factor. The computing device may send the adjusted shared video data stream to the destination device.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 8A-8D depict an illustrative depiction of selection of the center point used in targeting and enlarging a portion of a presentation in some implementations.

DETAILED DESCRIPTION

Figure 1:
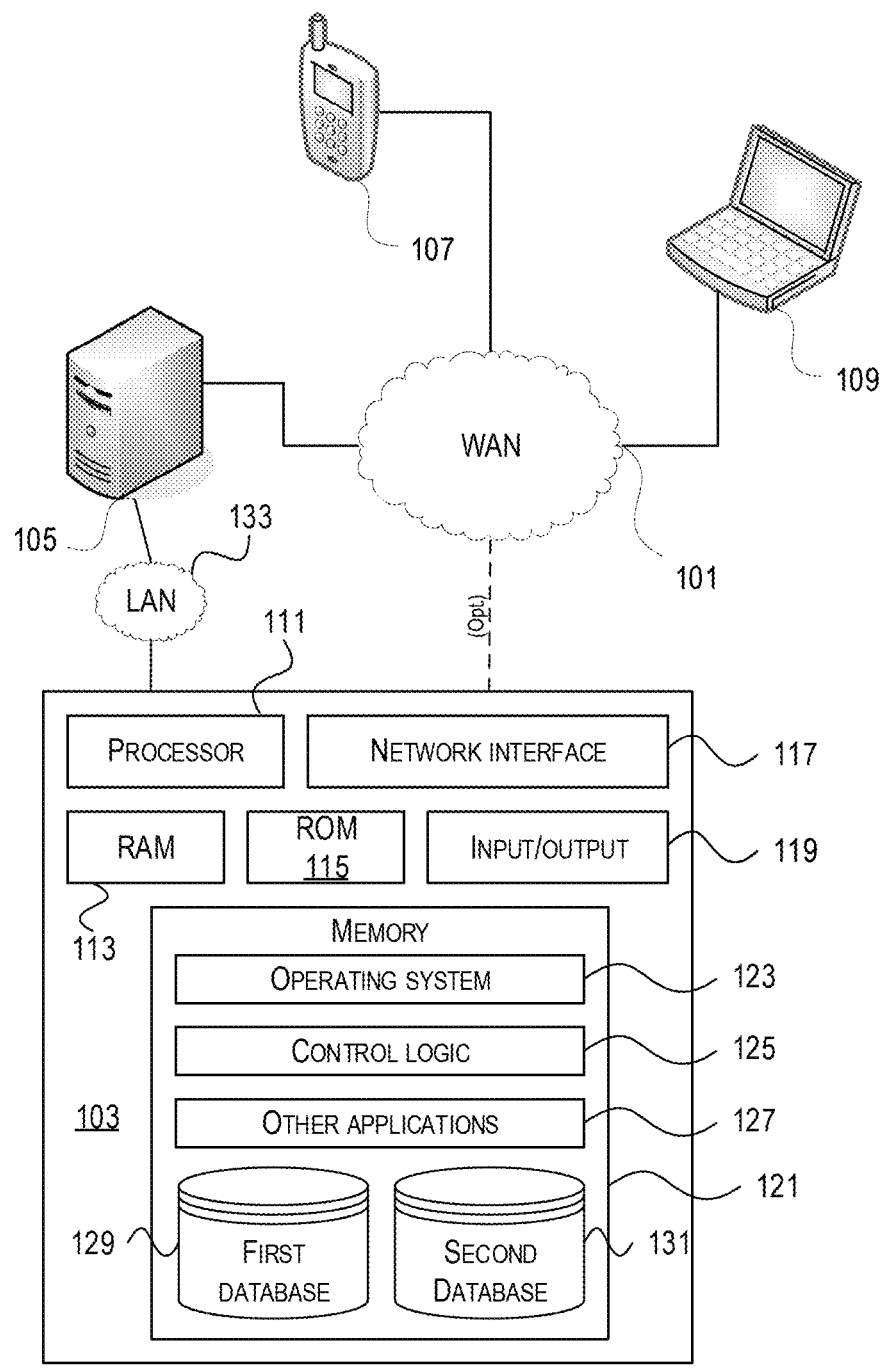
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. (and update abstract)

Systems and methods described herein are directed towards techniques of targeting focus and/or enlarging images upon detection that a receiver of shared content (e.g., video content or other shared data content) is using a smaller screen. The presenter may indicate a point (e.g., a focus point) on the displayed content being shared to indicate where the targeted focusing and enlarging should be centered. For example, a presenter may perform a long click on a point that is to be the focus point. Various other selection methods for the focus point may be used and are further described herein.

In some implementations, a focus area and an enlargement factor are calculated based on a difference in screen size between a presenter device and a destination device. A presenter device may be a computing device that is sharing data with other computing devices. For example, the presenter device is sharing what is being shown on a display of the presenter device to the other computing devices to be shown on their respective displays. A destination device may be a computing device that receives the shared data to show on its respective display. The focus area and enlargement factor may be calculated such that elements of the shared content are substantially the same size to a viewer of the destination device as they appear to the presenter on their presenter device. Therefore, different destination devices may have different focus areas and enlargement factors depending on screen size for those devices as the case maybe.

In some implementations, the point of focus (i.e., the focus point) may be adjusted based on the focus area and enlargement factor to prevent the focus area from including portions with no content. For example, if the presenter indicates a point that is in the far upper right of the shared content, the focus point may be adjusted to encompass an upper right quadrant of the shared content without other portions of the display that contain no shared content.

In some implementations, a presenter device may receive feedback on how the shared content is displayed on one or more destination devices. For example, the presenter device may be able to display a simulated view of the appearance of the focus area as enlarged for to respective destination device. Other feedback may be displayed on a display of the presenter device, such as the enlargement factor being used for a respective device.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," and similar terms, is meant to include both direct and indirect mounting, connecting, and coupling.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. The various methods described herein may comprise an algorithm executed on a computing device. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
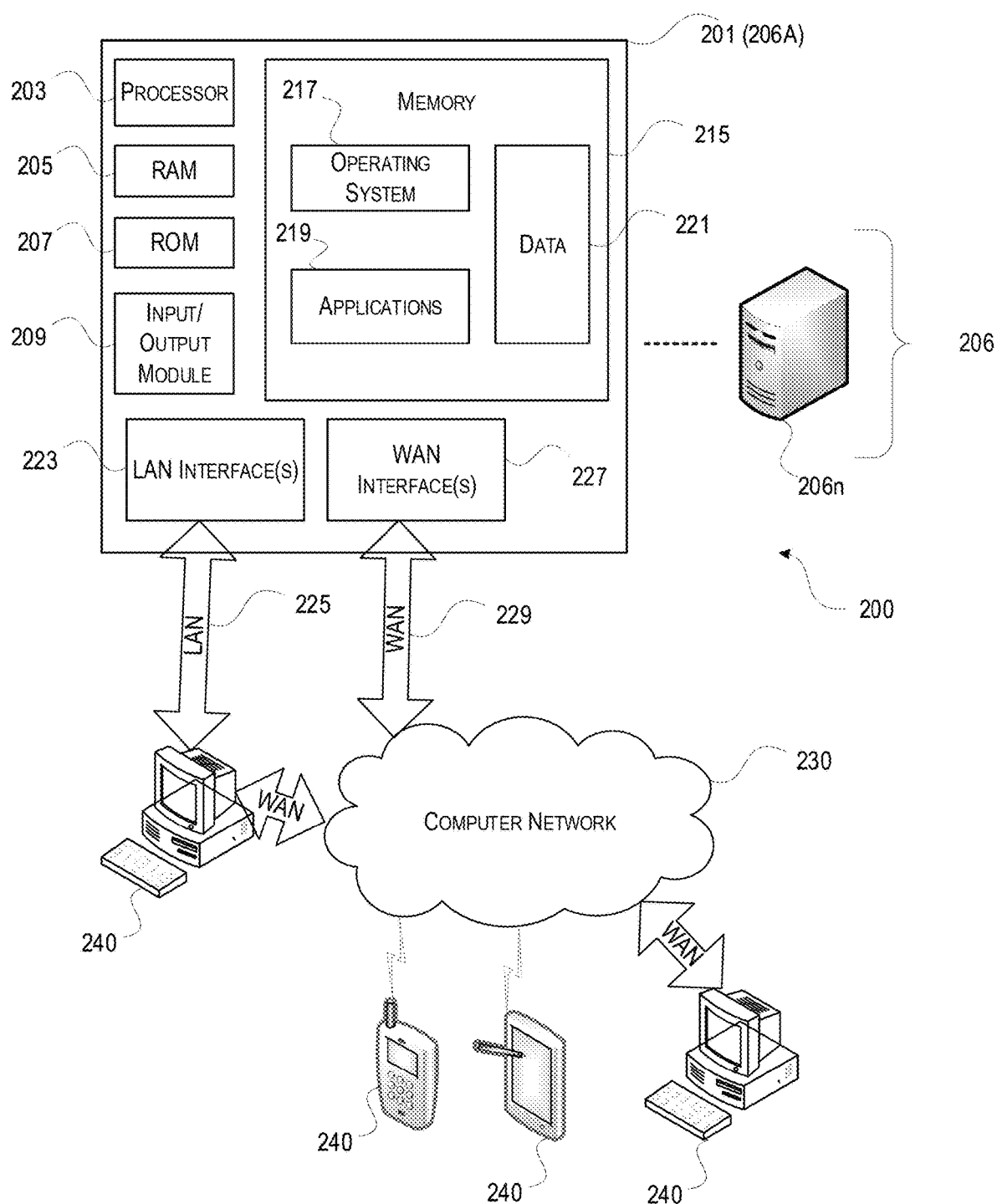
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Flordia.; or the Remote Desktop Protocol (RDP) manufactured by the Microsoft Corporation of Redmond, Washington.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
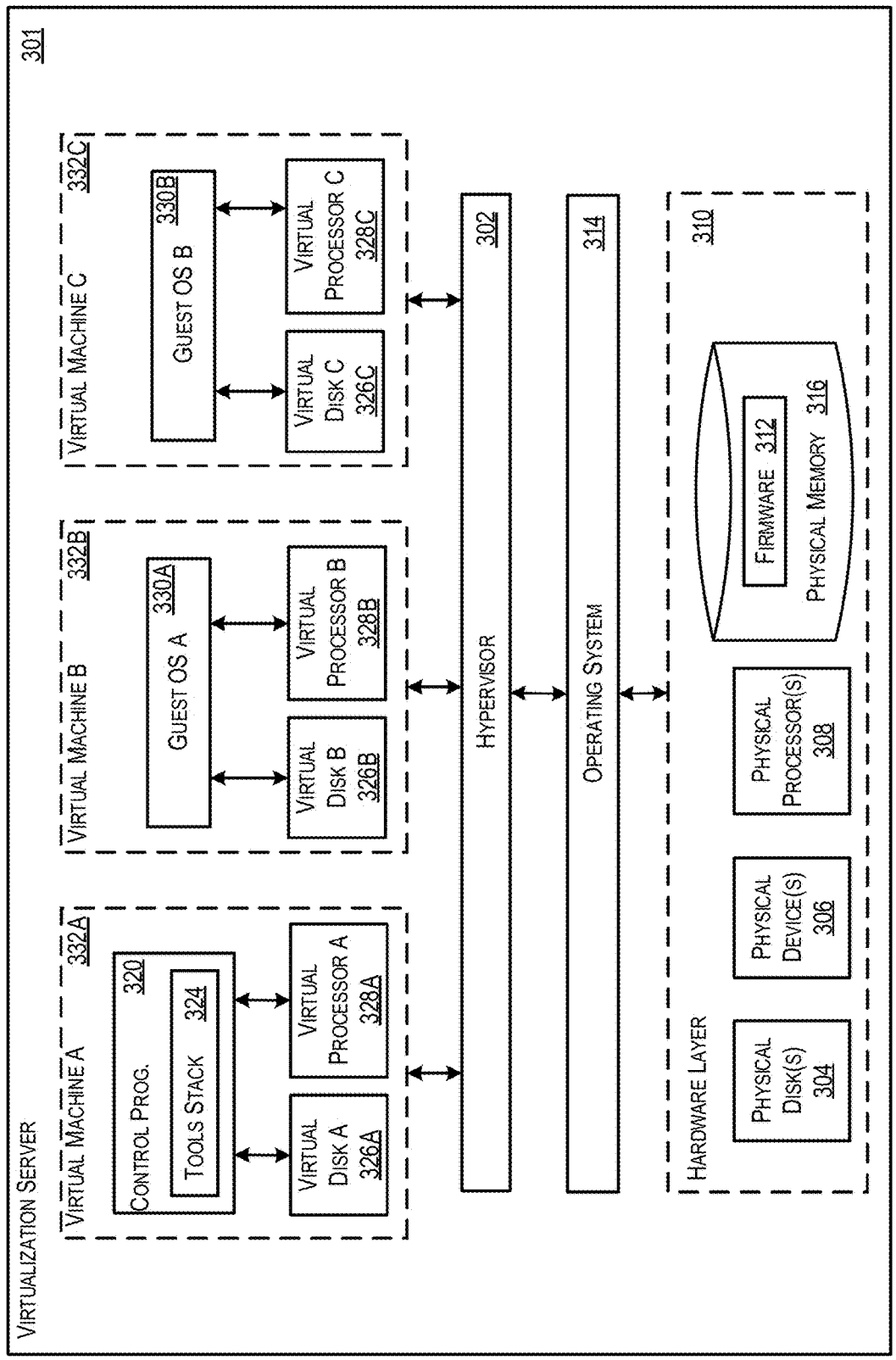
FIG. 3 depicts an illustrative computing system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, California; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, FL.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
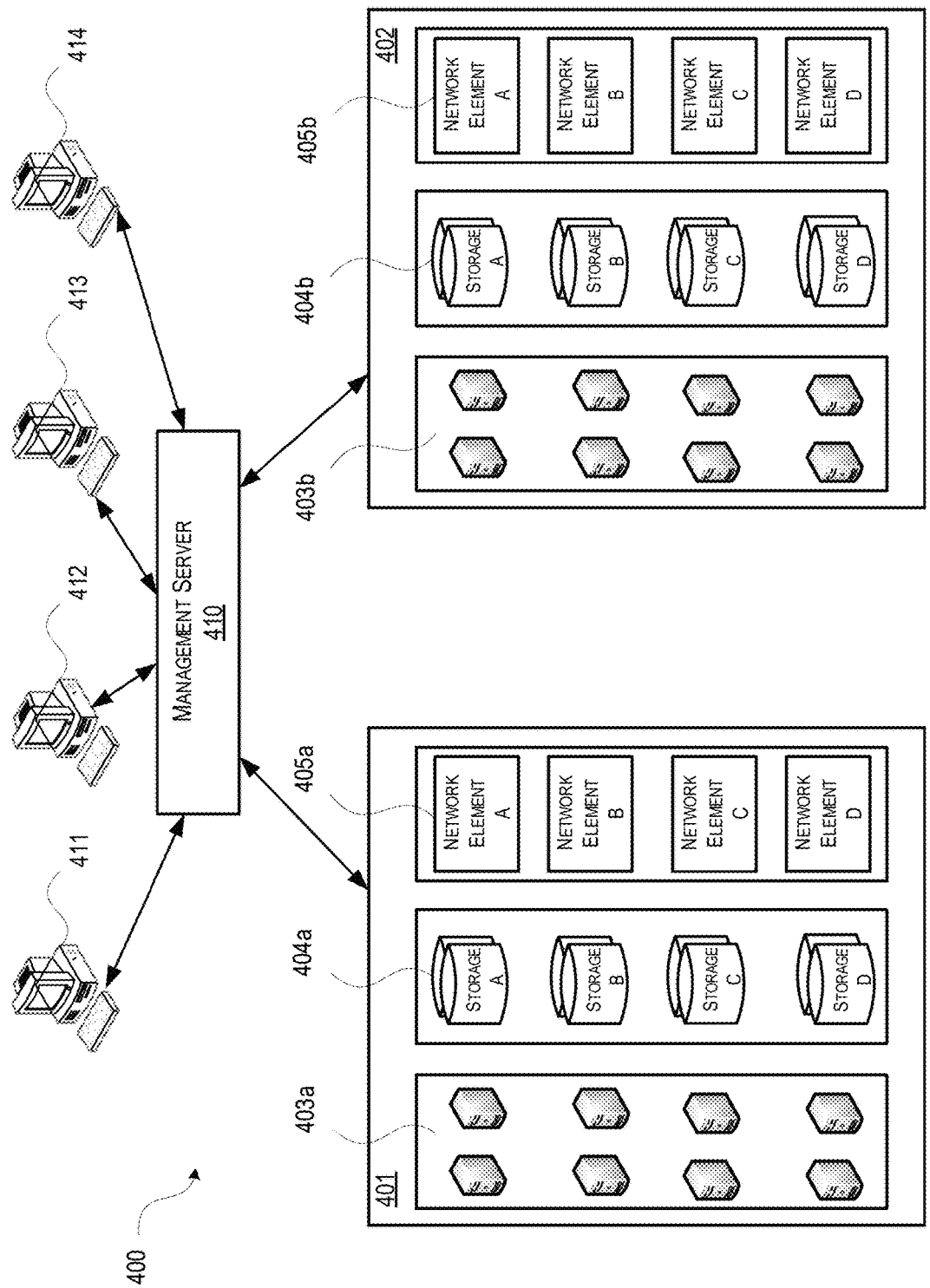
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, FL, or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Washington), AMAZON EC2 (Amazon.com Inc. of Seattle, Washington), IBM BLUE CLOUD (IBM Corporation of Armonk, New York), or others.

Example System for Focus of Shared Content

Figure 5:
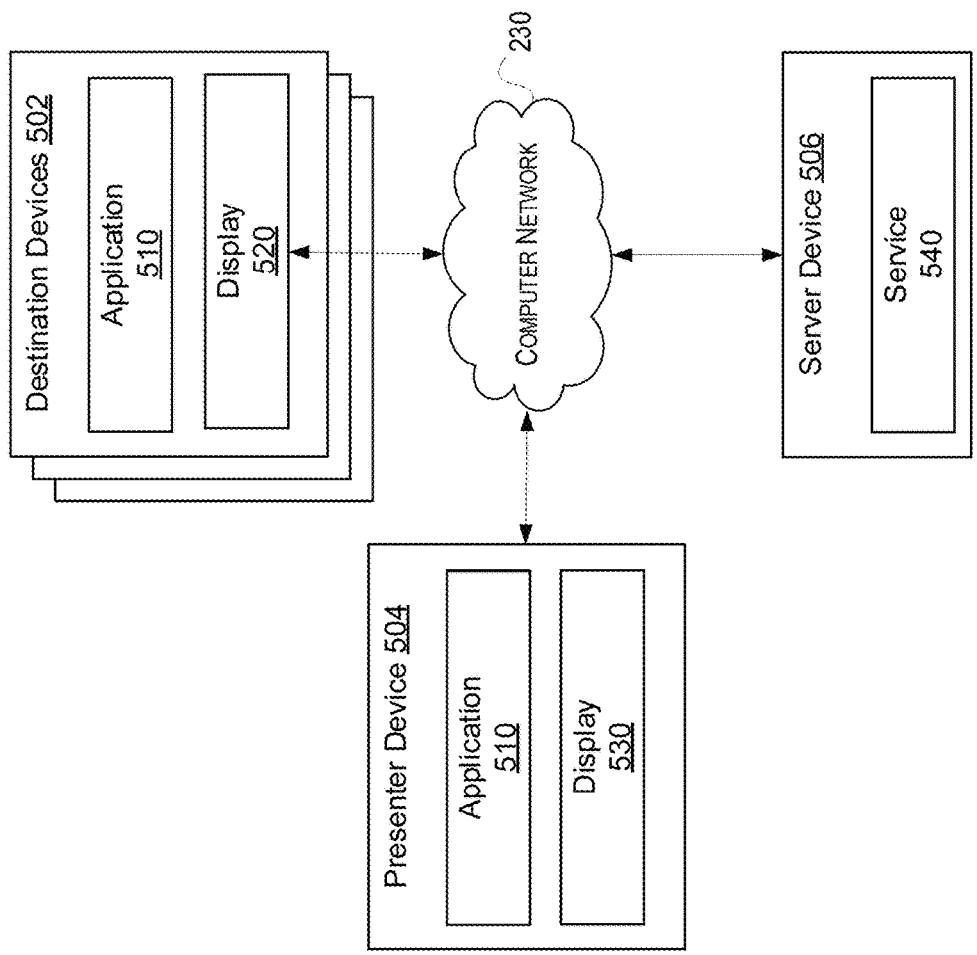
FIG. 5 depicts an illustrative platform architecture that may be used in accordance with one or more illustrative aspects described herein.

FIG. 5 depicts an illustrative platform architecture that may be used in accordance with one or more illustrative aspects described herein. As shown, presenter device 504, server device 506, and destination devices 502 may communicate through computer network 230. The devices may be implemented or performed, for example, by one or more of the systems as discussed in connection with FIGS. 1-4. The devices may operate in a networked environment, for example, transferring data over networks such as computer network 230 (e.g., the Internet). It will be appreciated that the network connections shown are illustrative and other means of establishing a communications link between the devices may be used.

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

The devices (e.g., devices 502 and devices 504) may comprise screens or displays (e.g., displays 520 and displays 530). Displays may be of different sizes, resolutions, aspect ratios and other parameters associated with computer displays. The displays may provide textual, audiovisual, and/or graphical output.

Presenter device 504 may comprise an application 510 (e.g., a meeting or collaboration application). In some implementations, application 510 is configured to send shared data or content to a server device. In some implementations, the application 510 is one of various video conference tools. For example, the application 510 may be configured to accept an input to begin screen sharing and data depicting the contents of a display is streamed or otherwise provided to a server device. In another example, application 510 may be configured to detect a selection of a particular application and share data depicting the contents of a window containing the application to a server device. The sharing of the data or content may be started and ended using inputs to the application 510. In some implementations, application 510 is configured to allow other participants of a meeting to take control to share their screens and/or applications where the remaining participants have their devices become destination devices for the streamed or otherwise shared data.

Further, the application 510 may be configured to send a relative position to a server device. In some implementations, the relative position is a position on the display of the presenter device depicting the content (e.g., video) that is being shared. The application 510 may be configured to detect an interaction in order to indicate a position that should be target focused and potentially enlarged on a destination device with a potentially smaller display. The application 510 may be configured to detect a plurality of interactions. For example, the interaction may be a long click on the position of a display using a mouse, touchpad, touchscreen, or equivalent and the position of the pointer is captured relative to the data being shared. In another example, the interaction may be double-clicks or multi-clicks on a position of the display using a mouse, touchpad, touchscreen, or equivalent. In a further example, the interaction may be clicking and dragging a pointer using a mouse, touchpad, touchscreen, or equivalent, and the center of the box bounded by the click and drag is determined to the relative position to be sent. For example when detecting a plurality of interactions, mouse events and/or mouse-motion events may be listened for by software and intercepted. In another example, similarly for touchpads and/or touchscreens, events may be listened for by software and intercepted. In some implementations, these described events may be ignored if they do not occur or are associated with a portion of the display that is being shared. The application 510 may be configured to detect the relative position where other input devices are used, such as keyboards, remote controls, virtual reality control devices, and the like. For example, events generated by these other input devices and the like may be listened for by software and intercepted. In another example, similarly for touchpads and/or touchscreens, events may be listened for by software and intercepted. Other events may be generated by other user input devices. In some implementations, these events generated by the other input devices and the like may be ignored if they do not occur or are associated with a portion of the display that is being shared.

Further, the application 510 may be configured to send information (e.g., display information) to a server device. Information about a display may be one or more of screen size, resolution, aspect ratio and other parameters associated with the computer display of the presenter device. In some implementations, the information may only be an indication of the type of device using the display to be used to infer an approximate size of the device, such as device serial or model number. Types of devices may be mobile phones, tablets, laptop computers, desktop computers, and the like.

Server device 506 may comprise a service 540 (e.g., a meeting service). In some implementations, service 540 is configured to receive shared data from a presenter device. Further, the service 540 may be configured to receive a relative position from the presenter device. In some implementations, the relative position is a position on the display of the presenter device depicting content that is being shared. The service 540 may be configured to receive information about a display from a presenter device. Information may be one or more of screen size, resolution, aspect ratio and other parameters associated with the computer display of the presenter device. In some implementations, information may only be an indication of the type of device using the display to be used to infer an approximate size of the device. Types of devices may be mobile phones, tablets, laptop computers, desktop computers, and the like.

Further, the service 540 may be configured to send shared data to a destination device. In some implementations, service 540 is configured to function as a pass through to provide the shared data from the presenter device to the destination device without substantial reformatting. In some implementations, meeting service 540 is configured to buffer shared data to decrease potential problems with lagging, network interruption, or other minor streaming difficulties. In some implementations, service 540 is configured to reformat the shared data before sending it to the destination device. For example, the shared data may be reformatted to send only the targeted focus and/or enlarged portion of the shared data. In some implementations, the service 540 is configured to send the full or entire amount of shared data for the destination device to reformat to display only the targeted focus and enlarged portion of the shared data. Further description of the techniques to calculate the targeted focus location as well as the amount of enlargement is discussed herein in further detail below.

Further, the service 540 may be configured to send a relative position to the destination device. In some implementations, the relative position is the position selected by a user of the presenter device of shared data. The relative position may be an adjusted position of the relative position selected by the user of the presenter device to avoid blank portions of the shared data. In some implementations, the relative position is used by the destination device along with the shared data to reformat the shared data to display the targeted focus and enlarged portion of the shared data.

Further, the service 540 may be configured to receive information (e.g., display information) from a destination device. Information may be one or more of screen size, resolution, aspect ratio and other parameters associated with the computer display of the destination device. In some implementations, the information may only be an indication of the type of device using the display to be used to infer an approximate size of the device. Types of devices may be mobile phones, tablets, laptop computers, desktop computers, and the like.

In some implementations, the service 540 may be configured to send an updated relative position to a destination device. The service 540 may be configured to update the relative position based on received information of a destination device. The updated relative position may change which portion of the shared data is enlarged and/or repositioned. In some implementations, the service 540 is configured to update the relative position using the information sent by the destination device prior to the targeted focus and enlarged data being displayed on the destination device.

In some implementations, the service 540 may be configured to send a simulated view of the destination device to a presenter device. In some implementations, the simulated view is a representation of what is being (or might be) seen by a user of the destination device. In some implementations, the service 540 is configured to receive data that is being displayed on the destination device from the destination device to be further sent to the presenter device. In some implementations, an indication of a user of a respective destination device is received from the presenter device and the service 540 is configured to send a representation of what the user of the respective destination device is seeing.

Destination devices 502 may comprise an application 510 (e.g., meeting or other collaboration application). In some implementations, the application 510 may be configured to receive shared data from a server device. Further, the application 510 may be configured to receive a relative position to the destination device indicative of a location for targeted focus and/or enlargement. In some implementations, the shared data is already reformatted by the server device and is received as reformatted shared data. For example, the shared data may be reformatted to be the targeted focus and/or enlarged portion of the shared data. In some implementations, the application 510 is configured to receive the full amount of shared data. The application 510 may be configured to reformat the shared data to enlarge the portion of the shared data around the targeted focus point and to display the targeted focus and enlarged portion of the shared data based on the received relative position.

In some implementations, the relative position is the position selected by a user of the presenter device of shared data. The relative position may be an adjusted position of the relative position selected by the user of the presenter device to avoid the shared data having blank portions and/or non-relevant data. In some implementations, the application 510 of the destination device is configured to adjust the relative position to avoid any blank portions and/or non-relevant data of the shared data.

Further, the application 510 of the destination device may be configured to send information to enable adjustment of shared content or data. The information may be one or more of screen size, resolution, aspect ratio and other parameters associated with a display. In some implementations, the information may be an indication of the type of device using the display to be used to infer an approximate size of the device. Types of devices may be mobile phones, tablets, laptop computers, desktop computers, and the like.

In some implementations, the application 510 of the destination device may be configured to receive an updated relative position to a destination device consequent or otherwise subsequent to sending the information. The updated relative position may change which portion of the shared data is enlarged and/or displayed.

Figure 6:
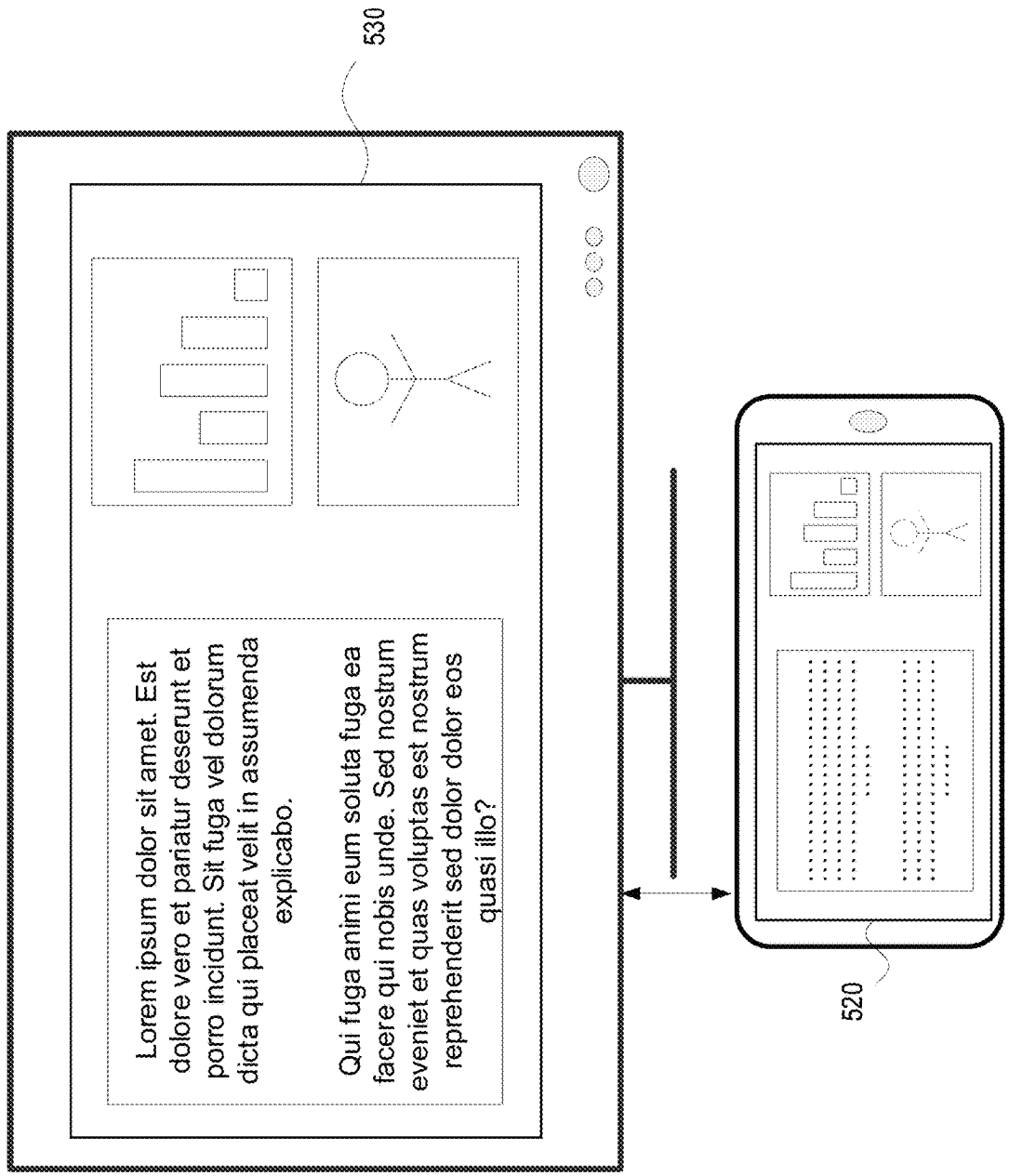
FIG. 6 depicts an illustration of shared data rendered illegible when viewed on a smaller screen.

FIG. 6 depicts an illustration of shared data rendered illegible when viewed on a smaller screen. A display 530 from a presenter device (e.g., presenter device 504) is depicted along with a display 520 of a destination device (e.g., destination device 502). As can be seen in the depiction, certain elements, such as text, may be rendered illegible or difficult to decipher when displayed on a smaller screen.

Figure 7:
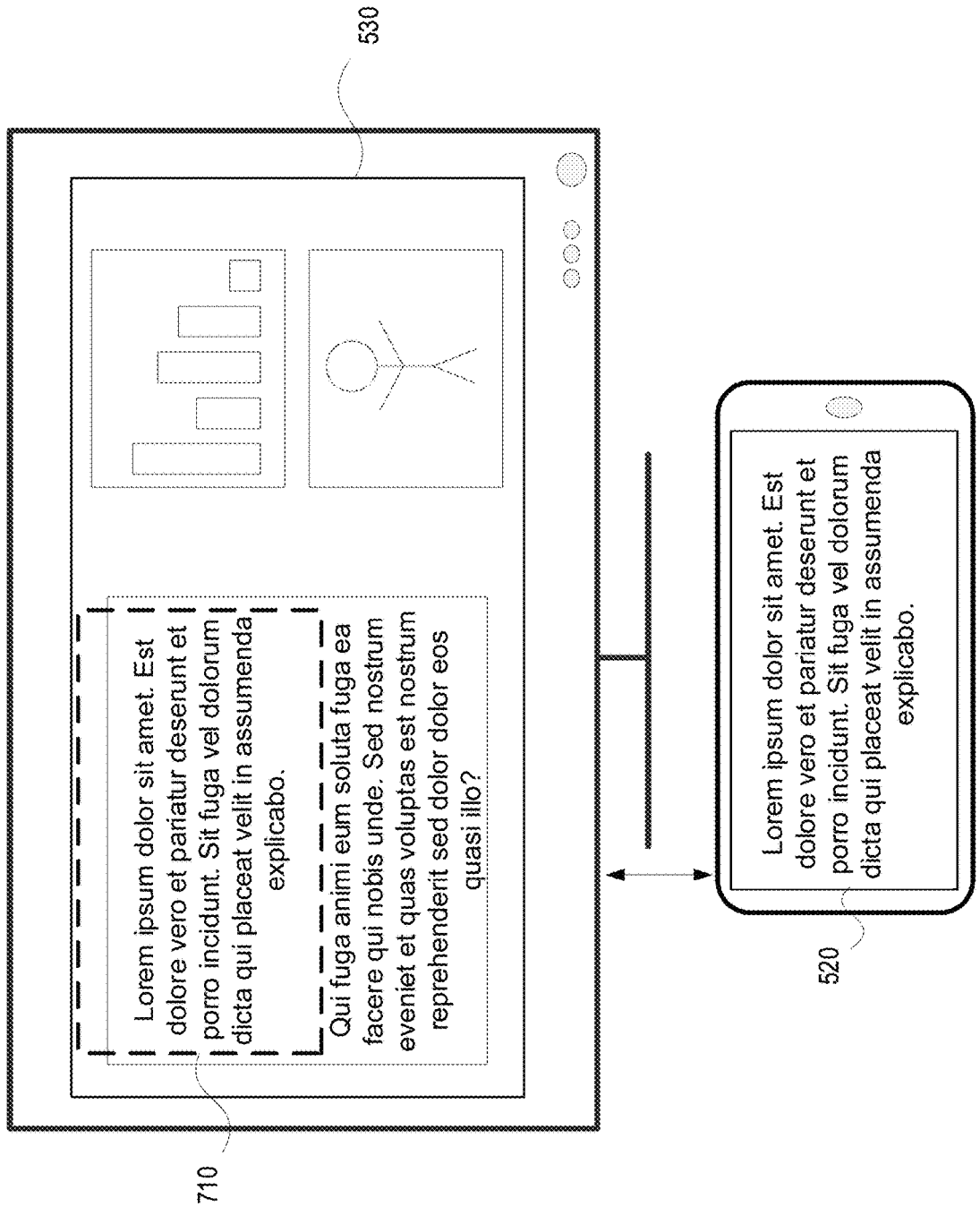
FIG. 7 depicts an illustration of targeting and enlarging to make a portion of a presentation legible when viewed on a smaller screen in some implementations.

FIG. 7 depicts an illustration of a presentation using targeted focusing and/or enlarging to make an indicated portion 710 of the presentation more legible when viewed. A display 530 from a presenter device (e.g., presenter device 504) is depicted along with a display 520 of a destination device (e.g., destination device 502). As can be seen in the depiction, certain elements, such as a portion of the text (e.g., indicated portion 710), may be rendered legible once target focused and enlarged when compared to the example of FIG. 6.

Calculating Enlarging Factor

For example, an enlargement factor to be used may be calculated using:

$$\alpha = \frac{S_p/D_p}{S_d/D_d}$$

Where, $\alpha$ may be the calculated enlargement factor. $S_p$ may be the screen size of the display of the presenter. $D_p$ may be the distance of the presenter to display of the presenter. $S_d$ may be the screen size of the destination display. $D_d$ may be the distance of a person viewing the destination display to the destination display.

| Table summarizing variables and example experiential values | | |
|---|---|---|
| Variable | Explanation | Experiential value |
| $S_p$ | The screen size of the presenter's display | 24 inches |
| $D_p$ | The distance of the presenter to the presenter's display | 24 inches |
| $S_d$ | The screen size of the destination device | 6 inches |
| $D_d$ | The distance of the viewer to the destination device | 12 inches |
| $\alpha$ | An example calculated enlargement factor | 2 |

In another example, using the values on the table above, the enlargement factor may be calculated to be 2 by determining;

$$\alpha = \frac{24/24}{6/12} = \frac{1}{1/2} = 2$$

In some implementations, the screen sizes are the size of the screen in one dimension. For example, the screen sizes may all be the length of the diagonal of the respective displays. In another example, the screen sizes may all be the width of the respective displays. In some implementations, the values for the screen sizes may be obtained by querying the devices directly. In some implementations, the sizes may be estimated based on other known factors of the different displays. For example, it may be known that the destination display is on a mobile device, but a computing device is unable to query the device for the display size and the display size of the mobile device is set to 6 inches as an estimate. A table or other computer stored data of experiential values may be used when unable to obtain the actual values and the values must be estimated based on other known information.

Figure 8A:
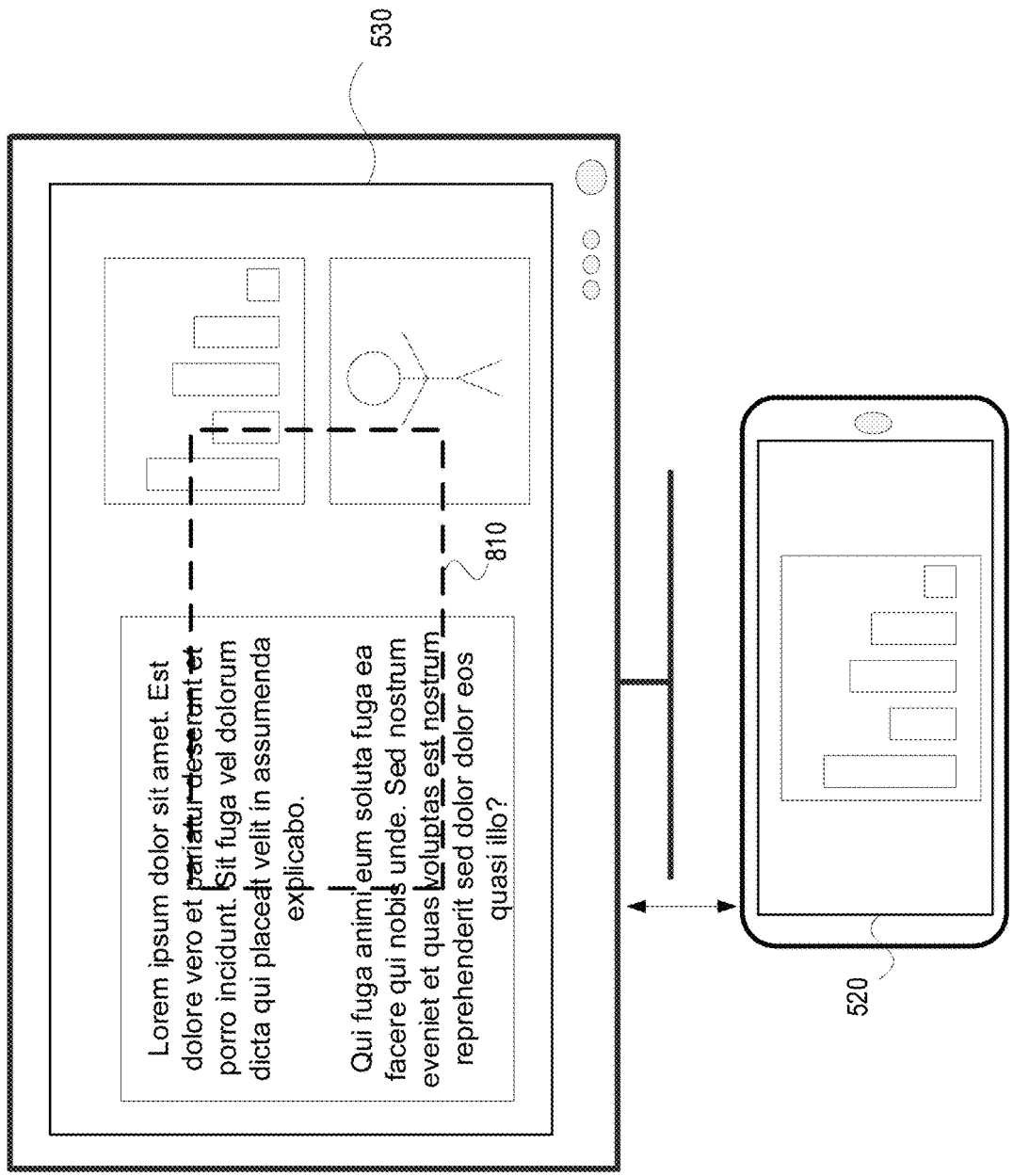
Figure 8C:
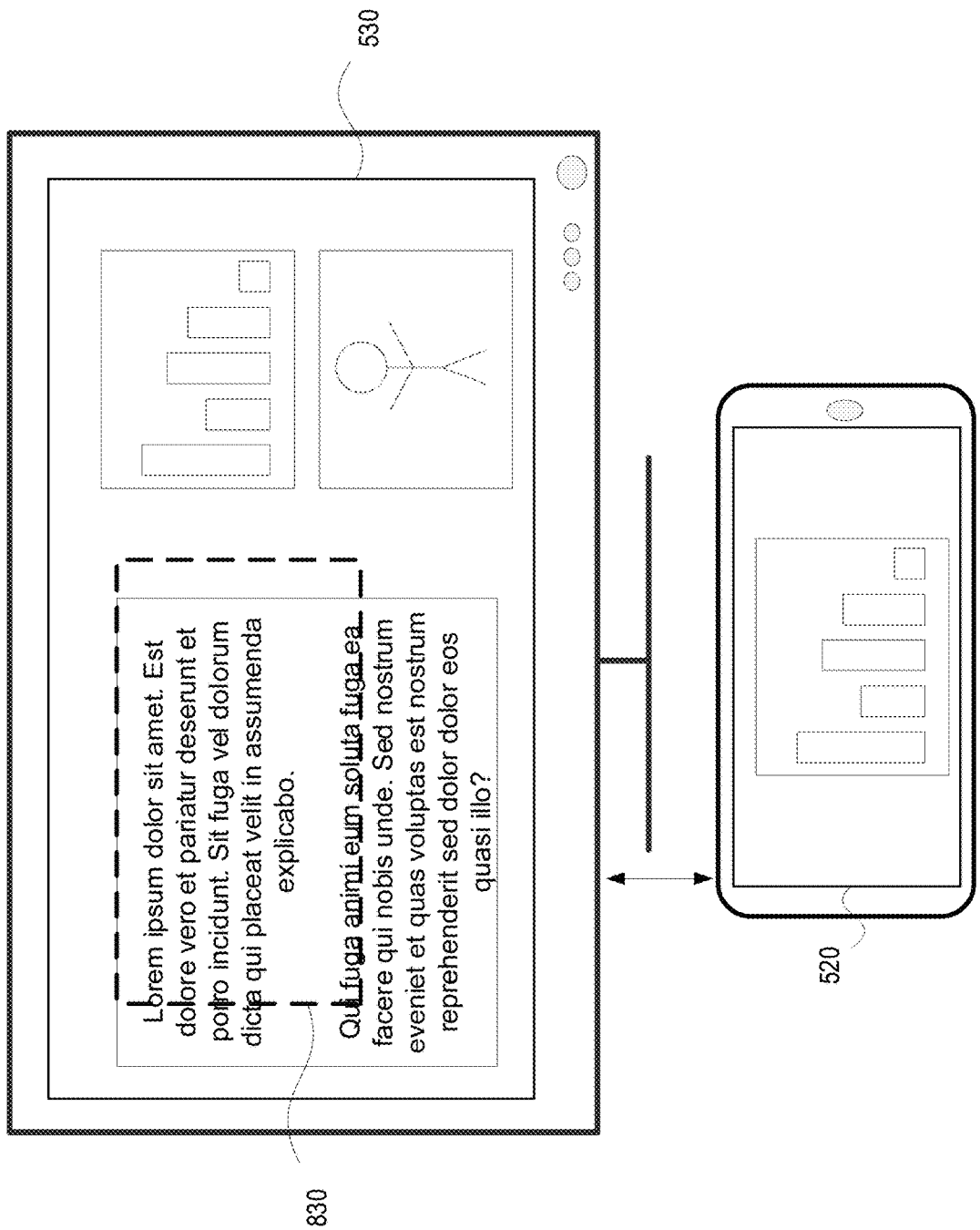
Figure 8D:
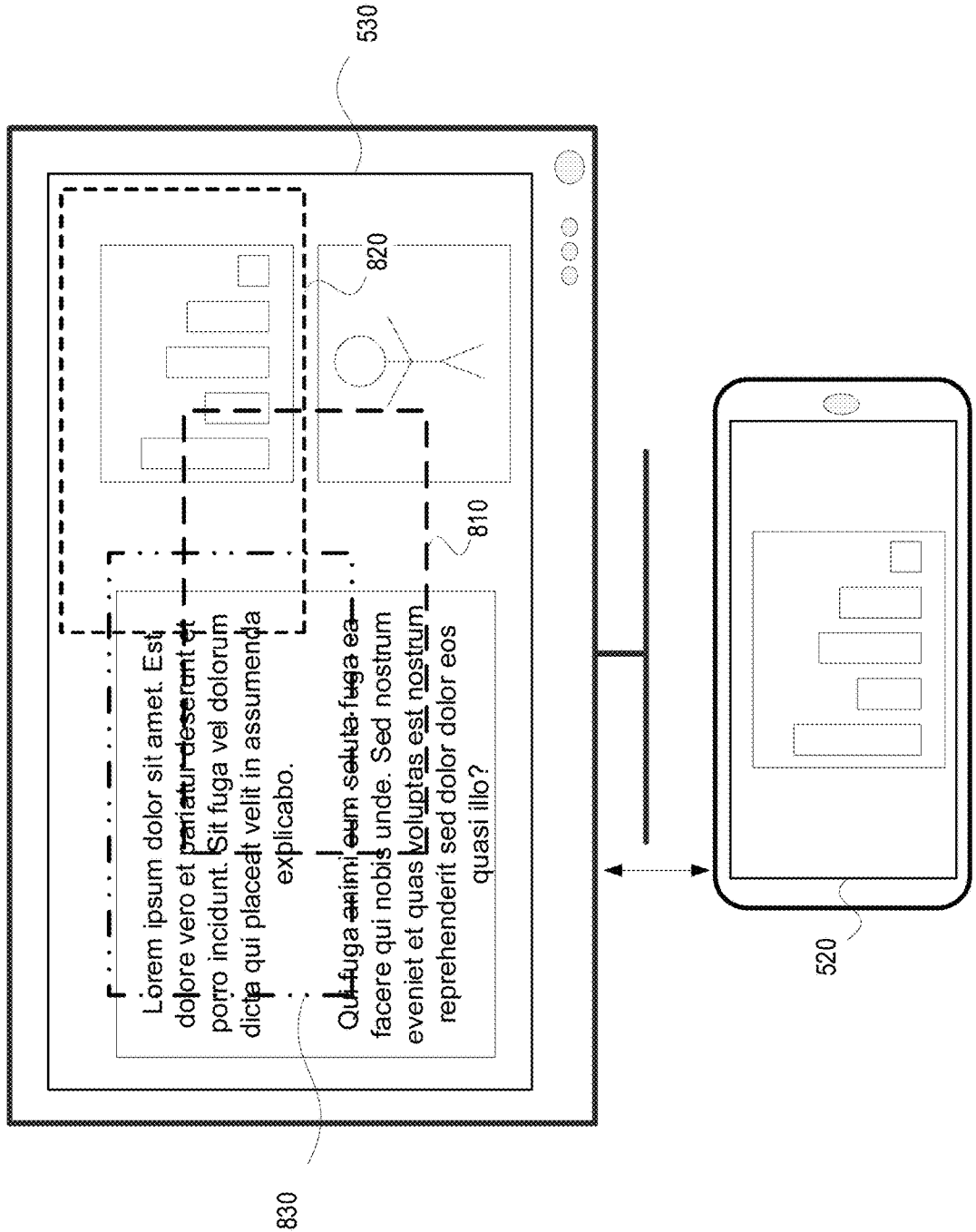

FIGS. 8A-8D depict an illustration of a presentation using targeted focusing and/or enlarging to make an indicated portion of the presentation more legible when viewed on display of smaller size. A display 530 from a presenter device (e.g., presenter device 504) is depicted along with a display 520 of a destination device (e.g., destination device 502). As can be seen in the depiction, certain elements, such as a portion of the text, may be rendered legible once target focused and enlarged when compared to the example of FIG. 6. Some boundaries illustrative of some techniques of locating a center point when target focusing are shown by boundary 810, boundary 820, and boundary 830. FIG. 8A depicts boundary 810. FIG. 8B depicts boundary 820. FIG. 8C depicts boundary 830. Finally, FIG. 8D depicts all the boundaries in one illustration. Once an enlargement factor is calculated when taking into account a presenter screen size and a destination screen size, a boundary size may be determined which represents the maximum amount of screen that may be shown on the destination screen to fill the screen at the enlarged size. The enlargement factor may be calculated to approximate the size of elements on the screen on the presenter device when shown on the destination device. In another example, the enlargement factor may be calculated to have the size of the elements on the screen be substantially the same on the presenter device as when shown on the destination device.

Boundary 810 depicts an area that has been calculated such that any user interaction outside boundary 810 would result in a central focus point with a target focused and/or enlarged area that would partially be outside the actual presented image. In other words, the location of the interaction should not be used as the central focus point if it is outside boundary 810 or part of the display on the destination device would be wasted by including no content at all. Therefore, an example technique to determine a more appropriate central focus point is to determine that the location of the interaction is outside of boundary 810, determine the closest point located on boundary 810 to the location of the interaction, and use that closest point located on boundary 810 as the central focus point to determine the target focused and/or enlarged area to display on the destination device.

The exact dimensions of boundary 810 may vary depending on the size of the display of the destination device and the calculated enlargement factor to display on the destination device. For example, if the enlargement factor is calculated to be a factor of α, the scope of the boundaries of boundary 810 may be:

$$L/2\alpha \le l \le L-L/2\alpha; W/2\alpha \le w \le W-W/2\alpha$$

In this example, the entire screen size may be defined by L×W (length and width). The boundaries of boundary 810 may be defined by (l×w) (length and width of boundary 810).

In some implementations and continuing the example where the enlargement factor is calculated to be a factor of α, locating the closest point on boundary 810 and setting the central focus point to be the closest point on boundary 810 is accomplished by adjusting the central focus point. The central focus point (x, y) may be adjusted, for example, by:
 If x<L/2α, then set x=L/2α,
 If y<W/2α, then set y=W/2α;
 If x>L−L/2α, then set x=L−L/2α;
 If y>W−W/2α, then set y=W−W/2α

Once the central focus point (x, y) is adjusted to be on boundary 810, the screen display area around the central focus point, equivalent to $$\frac{1}{\alpha^2}$$

screen display area of the presenter screen display area, may be enlarged by a factor of a to fill the display area of the destination device.

Example: Enlargement Factor Calculated to be α

For example, if the enlargement factor is calculated to be a factor of α, the scope of boundary 810 may be:

$$L/2\alpha \le l \le L-L/2\alpha;$$
$$W/2\alpha \le w \le W-W/2\alpha$$

In this example, the entire screen size is defined by L×W (length and width). The boundary 810 being defined by (l×w) (length and width of boundary 810).

In some implementations and continuing the example where the enlargement factor is calculated to be a factor of α, locating the closest point on boundary 810 and setting the central focus point to be the closest point on boundary 810 is accomplished by adjusting the central focus point. The central focus point (x, y) may be adjusted, for example, by:
 If x<L/2α, then set x=L/2α,
 If y<W/2α, then set y=W/2α;
 If x>L−L/2α, then set x=L−L/2α;
 If y>W−W/2α, then set y=W−W/2α

Once the central focus point (x, y) is adjusted to be on boundary 810, the screen display area around the central focus point, equivalent to $$\frac{1}{\alpha^2}$$

screen display area of the presenter screen display area, may be enlarged by a factor of a to fill the display area of the destination device.

Example: Enlargement Factor Calculated to be 2

In a further example, if the enlargement factor is calculated to be a factor of 2, the scope of the boundary 810 may be:

$$L/4 \le l \le L-L/4;$$
$$W/4 \le w \le W-W/4$$

or simplified to:

$$L/4 \le l \le 3L/4;$$
$$W/4 \le w \le 3W/4$$

Locating the closest point on boundary 810 and setting the central focus point to be the closest point on boundary 810 is accomplished by adjusting the central focus point. The central focus point (x, y) may be adjusted, for example, when the enlargement factor is 2, by:
 If x<L/4, then set x=L/4,
 If y<W/4, then set y=W/4;
 If x>3L/4, then set x=3L/2;
 If y>3W/4, then set y=3W/4

Once the central focus point (x, y) is adjusted to be on boundary 810, the screen display area around the central focus point, equivalent to ¼ screen display area of the presenter screen display area, may be enlarged by a factor of 2 to fill the display area of the destination device.

Boundary 820 depicts an example boundary where the location of the interaction is near the upper right corner of the display. Since the location of the interaction is outside of boundary 810, any determined area around the actual location of the interaction would result in a target focused and/or enlarged area that would partially be outside the actual presented image. Therefore boundary 820 depicts an example boundary that instead uses the closest point on boundary 810 to the location of the interaction as the center of the boundary. In this example, where the location of the interaction is near the upper right corner of the display, the closest point on boundary 810 is the upper right corner of boundary 810. Boundary 820 is the resultant target focused and enlarged area that will be displayed on the destination device when using the upper right corner of boundary 810 as the center point for an interaction near the upper right corner of the display.

Boundary 830 depicts an example boundary where the location of the interaction is located inside the boundary 810. Since the location of the interaction is inside the boundary 810, the location of the interaction can be used as the central focus point for the resultant target focused and enlarged area that will be displayed on the destination device. Boundary 820 is the resultant target focused and enlarged area that will be displayed on the destination device when an interaction inside the boundary 810 is used as the center point for the focused and enlarged area.

Figure 9:
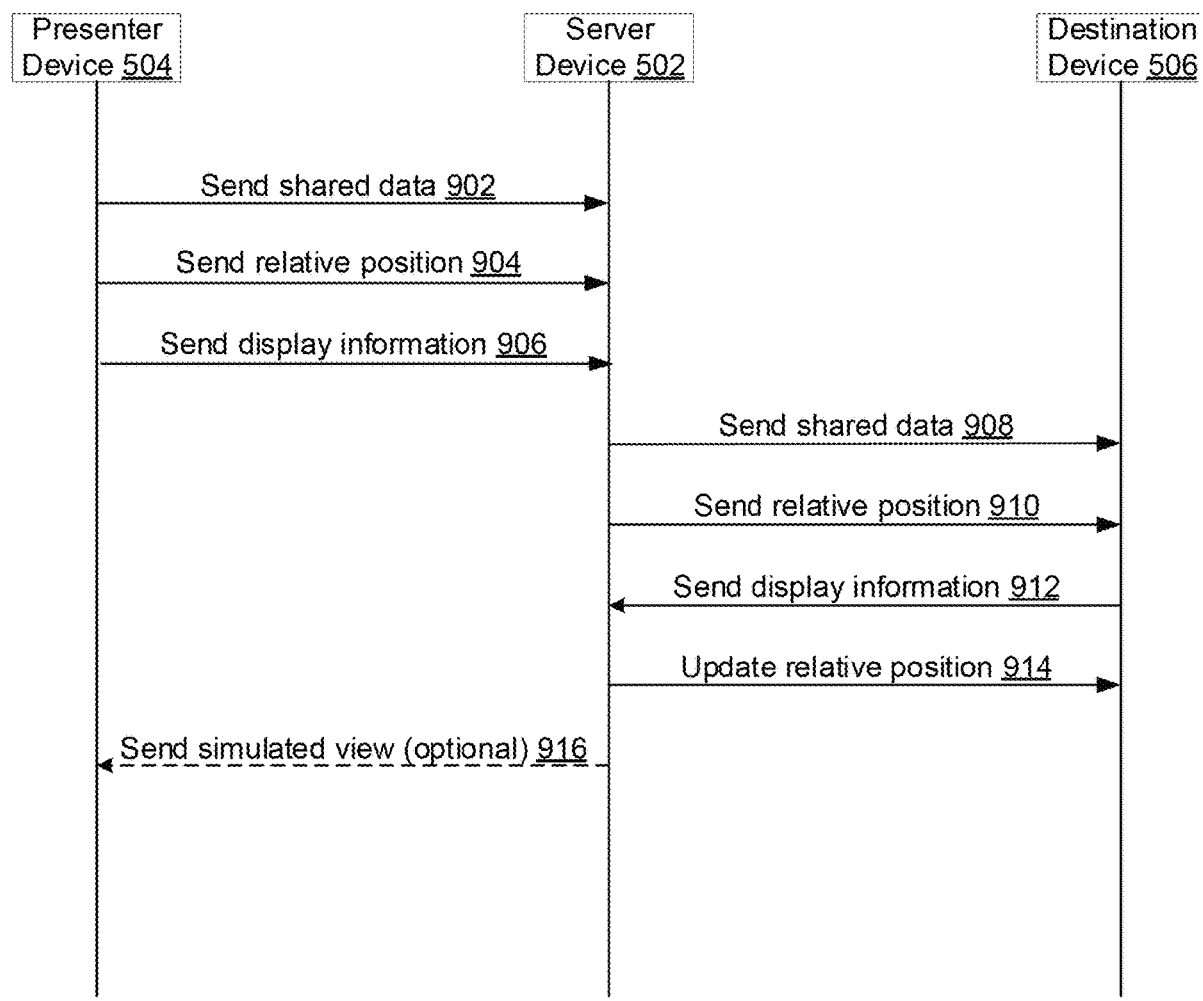
FIG. 9 depicts a schematic representation of data movement for targeted focus and enlargement of shared content.

FIG. 9 depicts a schematic representation of data sharing or movement for targeted focus and enlargement of shared content. Data movement is shown between a presenter device (e.g., presenter device 504), a server device (e.g., server device 506), and a destination device (e.g., destination device 502). The steps shown for data movement may be performed by a single computing device or by multiple computing devices. One or more steps may be omitted, added, rearranged, and/or otherwise modified as desired by a person of ordinary skill in the art.

In step 902, a presenter device sends shared data to a server device. In some implementations, shared data is sent as part of a video conference using one of various video conference tools. For example, one of the participants of a video conference may begin screen sharing and data depicting the contents of a display used by the screen sharer is streamed or otherwise provided to the server device. In another example, a particular application is selected by the participant and data depicting the contents of a window containing the application is provided to the server device. The sharing of the data may be started and ended by the participant. In many video conference tools, participants may take control to share their screens and/or applications and the remaining participants have their devices become destination devices for the shared data.

In step 904, a presenter device sends a relative position to a server device. In some implementations, the relative position is a position on the display of the presenter device depicting the content that is being shared. The position on the display has been interacted with by a user of the presenter device in order to indicate a position that should be target focused and potentially enlarged on a destination device with a potentially smaller display. The position on the display may be selected by the user of the presenter device in a plurality of ways. For example, the user may perform a long click on the position of the display using a mouse, touchpad, touchscreen, or equivalent and the position of the pointer is captured relative to the data being shared. In another example, the user double-clicks or multi-clicks a position of the display using a mouse, touchpad, touchscreen or equivalent. In a further example, the user clicks and drags a pointer using a mouse, touchpad, touchscreen, or equivalent, and the center of the box bounded by the click and drag is determined to the relative position to be sent. The relative position may be selected using other input devices, such as keyboards, remote controls, virtual reality control devices, and the like.

In step 906, information (e.g., display information) is sent from a presenter device to the server device. Display information may be one or more of screen size, resolution, aspect ratio and other parameters associated with the computer display of the presenter device. In some implementations, the information may only be an indication of the type of device using the display to be used to infer an approximate size of the device display. Types of devices may be mobile phones, tablets, laptop computers, desktop computers, and the like. In some implementations, the parameters associated with the computer display of the presenter device may be adjusted if, for example, the video conferencing software is not using the entire area of the display to show shared video content.

In step 908, a server device sends shared data to a destination device. In some implementations, the server device acts as a pass through to provide the shared data from the presenter device to the destination device without substantial reformatting. The server device may buffer the shared data to decrease potential problems with lagging, network interruption, or other minor streaming difficulties. In some implementations, the server device reformats the shared data before sending it to the destination device. For example, the server device may reformat to send only the targeted focus and enlarged portion of the shared data. In some implementations, the server device sends the full amount of shared data for the destination device to reformat to display only the targeted focus and enlarged portion of the shared data.

In step 910, a relative position is sent to the destination device. In some implementations, the relative position is the position selected by a user of the presenter device of shared data as the targeted focus position. The relative position may be an adjusted position of the relative position selected by the user of the presenter device to avoid blank portions of the shared data. In some implementations, the relative position is used by the destination device along with the shared data to reformat the shared data to display the targeted focus and enlarged portion of the shared data.

In step 912, information (e.g., display information) is sent from a destination device to the server device. The information may be one or more of screen size, resolution, aspect ratio and other parameters associated with the computer display of the destination device. In some implementations, the information may only be an indication of the type of device using the display to be used to infer an approximate size of the device display. Types of devices may be mobile phones, tablets, laptop computers, desktop computers, and the like.

In step 914, an updated relative position is sent to the destination device. In some implementations, the relative position has been updated by the server device based on the information received in step 910. The updated relative position may change which portion of the shared data is enlarged and/or in focus for display. In some implementations, the relative position is updated using the information sent by the destination device prior to the target focused and enlarged data being displayed on the destination device.

In optional step 916, a simulated view of the destination device is sent by the server device to the presenter device. In some implementations, the simulated view is a representation of what is being or about to seen by a user of the destination device. In some implementations, the data that is being displayed on the destination device is sent by the destination device to the server device to be further sent to the presenter device. In some implementations, the user of the presenter device may select a user of a respective destination device to view a representation of what the user of the respective destination device is seeing or will see (e.g., in a preview like fashion).

Figure 10:
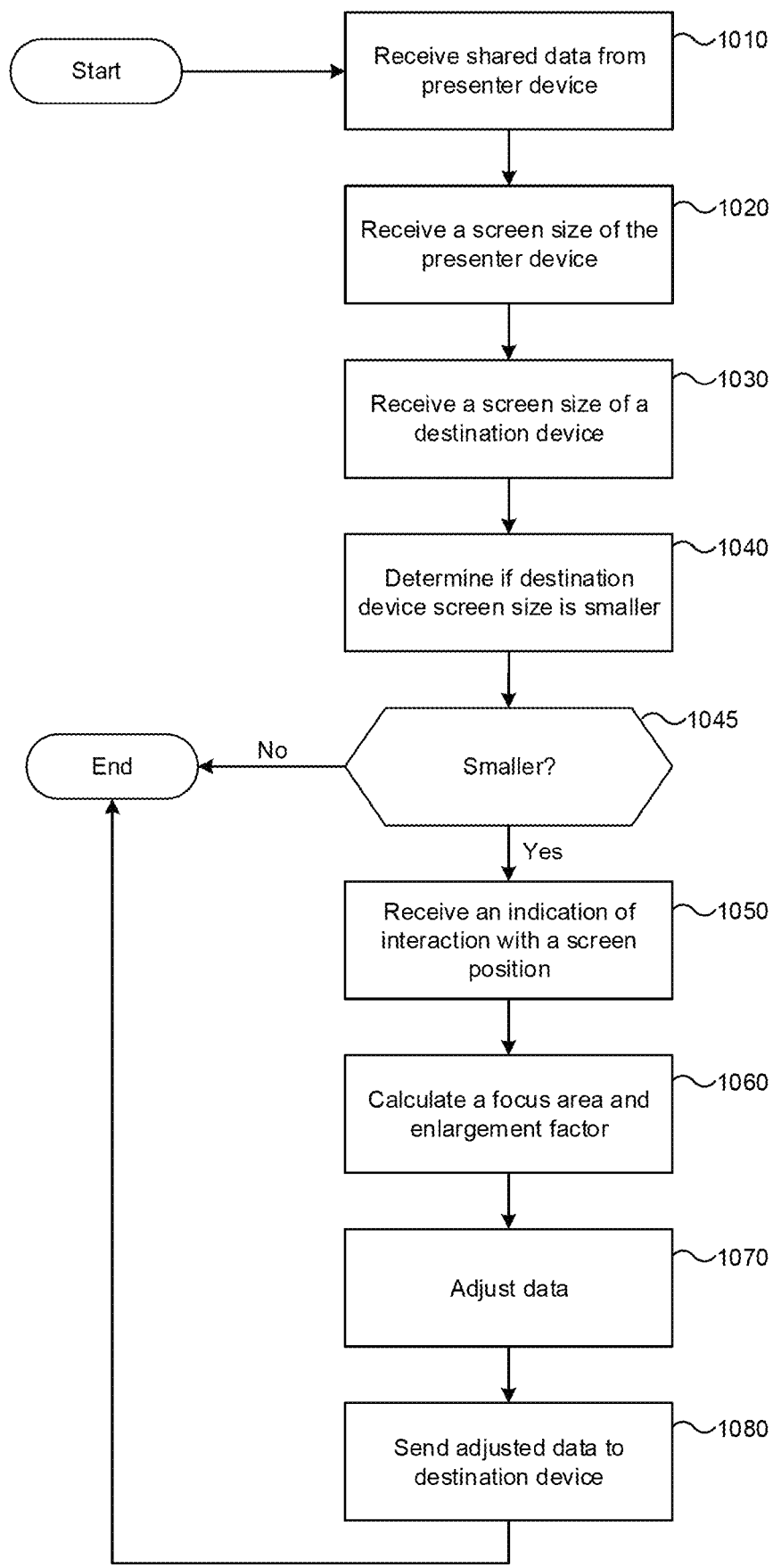
FIG. 10 depicts a flowchart showing an example method for adjusting data for targeted focus and enlargement of shared content.

FIG. 10 depicts a flowchart showing an example method for adjusting data for targeted focus and/or enlargement of shared content in some implementations. The method may be implemented or performed, for example, by one or more of the systems as discussed in connection with FIGS. 1-5. The method may be implemented or performed, for example, by one or more computing devices. The method may be implemented, for example, by a server device 502. The steps of the method may be described as being performed by particular components and/or computing devices for the sake of simplicity, but the steps may be performed by any component and/or computing device, or by any combination of one or more components and/or one or more computing devices. The steps of the method may be performed by a single computing device or by multiple computing devices. One or more steps of the method may be omitted, added, rearranged, and/or otherwise modified as desired by a person of ordinary skill in the art.

The steps depicted in FIG. 10 may include receiving shared data from a presenter device (e.g., presenter device 504) by a computing device (1010). The computing device may be as described above. The computing device may receive a screen size of the presenter device (1020). The computing device may receive a screen size of a destination device (e.g., destination device 502) (1030). The computing device may determine if the destination device screen size is smaller than the presenter device screen size. In some implementations, the determination is made by comparing the received screen size of the presenter device with the received screen size of the destination device. In some implementations, adjustments may be made to account for other factors of the screen size including resolution, aspect ratio and/or other parameters related to displays. If the destination device screen size is not smaller, then the process may end. If the destination device screen size is smaller, then the process proceeds to receive an indication of an interaction with a screen position (1050). The computing device may calculate a focus area and an enlargement factor (1060). The computing device may adjust the data (1070). The computing device may send the adjusted data to a destination device (1080).

Still referring to FIG. 10 and in more detail, the computing device may receive shared data from a presenter device (1010). In some implementations, the shared data is sent as part of execution of an application (e.g., a virtual conference using one of various software tools). For example, one of the participants of a virtual conference may begin screen sharing and data depicting the contents of a display used by the screen sharer is streamed to the server device. In another example, a particular application is selected by the participant and data depicting the contents of a window containing the application is streamed to the server device. The sharing of the data may be started and ended by the participant. In many software tools, participants may take control to share their screens and/or applications and the remaining participants have their devices become destination devices for the data. In some implementations, the computing device may buffer or otherwise store data in order to distribute the data to one or more destination devices that are also participants of the virtual conference.

The computing device may receive a screen size of the presenter device (1020) and the screen size of a destination device (1030). The screen size may be a diagonal measure of the size of the screen of the respective device. In some implementations, the screen size is a measure of the size of the screen of the respective device in another dimension. For example, it may be a measure of height of the screen of the respective device or the width of the screen of the respective device. In some implementations, the data received may only be an indication of the screen size of the respective device such as device type to be used to infer an approximate size of the device display. Types of devices may be mobile phones, tablets, laptop computers, desktop computers, and the like. In some implementations, other display information may be sent instead to substitute for or to be used rather than screen size. Display information may include one or more of screen size, resolution, aspect ratio and other parameters associated with computer displays.

The computing device may determine if the destination device screen size is smaller than the presenter device screen size (1040). In some implementations, the computing device may compare received values of the respective screen sizes. In some implementations, the computing device may have to infer one or more of the respective screen sizes based on other information such as a device type. In some implementations, the computing device may be comparing other received values for the respective devices including resolution, aspect ratio and other parameters associated with computer displays.

If the destination device is not smaller (1045:NO), then the process may end. If the destination device is smaller (1045:YES), then the computing device may receive an indication of an interaction with a screen position (1050). In some implementations, the received indication may be an interaction that is a selection by a user of relative position of the displayed video on the presenter device to be a position of targeted focus. The selection by the user may be done in a plurality of ways. For example, the user may perform a long click on the position of the display using a mouse, touchscreen, touchpad, or equivalent and the position of the pointer is captured relative to the data being shared. In another example, the user double-clicks or multi-clicks a position of the display using a mouse, touchpad, touchscreen, or equivalent. In a further example, the user clicks and drags a pointer using a mouse, touchpad, touchscreen, or equivalent, and the center of the box bounded by the click and drag is determined to the relative position to be sent. The relative position may be selected using other input devices, such as keyboards, remote controls, virtual reality control devices, and the like.

The computing device may calculate a focus area and an enlargement factor (1060). In some implementations, the dimensions of a boundary defining the focus area vary depending on the size of the display of the destination device and the calculated enlargement factor to display on the destination device. The enlargement factor may be calculated using a screens size of the display of the present, the distance of the presenter to the display, the screen size of the destination display, and the distance of a person viewing the destination display to the destination display. The calculations defining the boundary and the enlargement factor are discussed herein in more detail above.

The computing device may adjust the data (1070). In some implementations, the server device acts as a pass through to provide the shared data from the presenter device to the destination device without substantial reformatting. Some minimal formatting may be done to conform the data to the device type or operating system of the destination device. In some implementations, the shared data is reformatted to send only the targeted focus and enlarged portion of the shared data. For example, image and/or video data in the shared data is cropped such that only the focus area is sent. In some implementations, the image and/or video data may be enlarged by resizing or increasing the size of the individual pixels. In some implementations, the image and/or video data may be enlarged by resampling or adding additional pixel information. In some examples, enlargement of a portion of the shared data is instead a smaller amount of reduction or no amount of reduction that would otherwise have taken place for that portion of the shared data for the smaller display. In some implementations, the server device sends the full amount of shared data for the destination device to reformat to display only the targeted focus and enlarged portion of the shared data.

Figure 11:
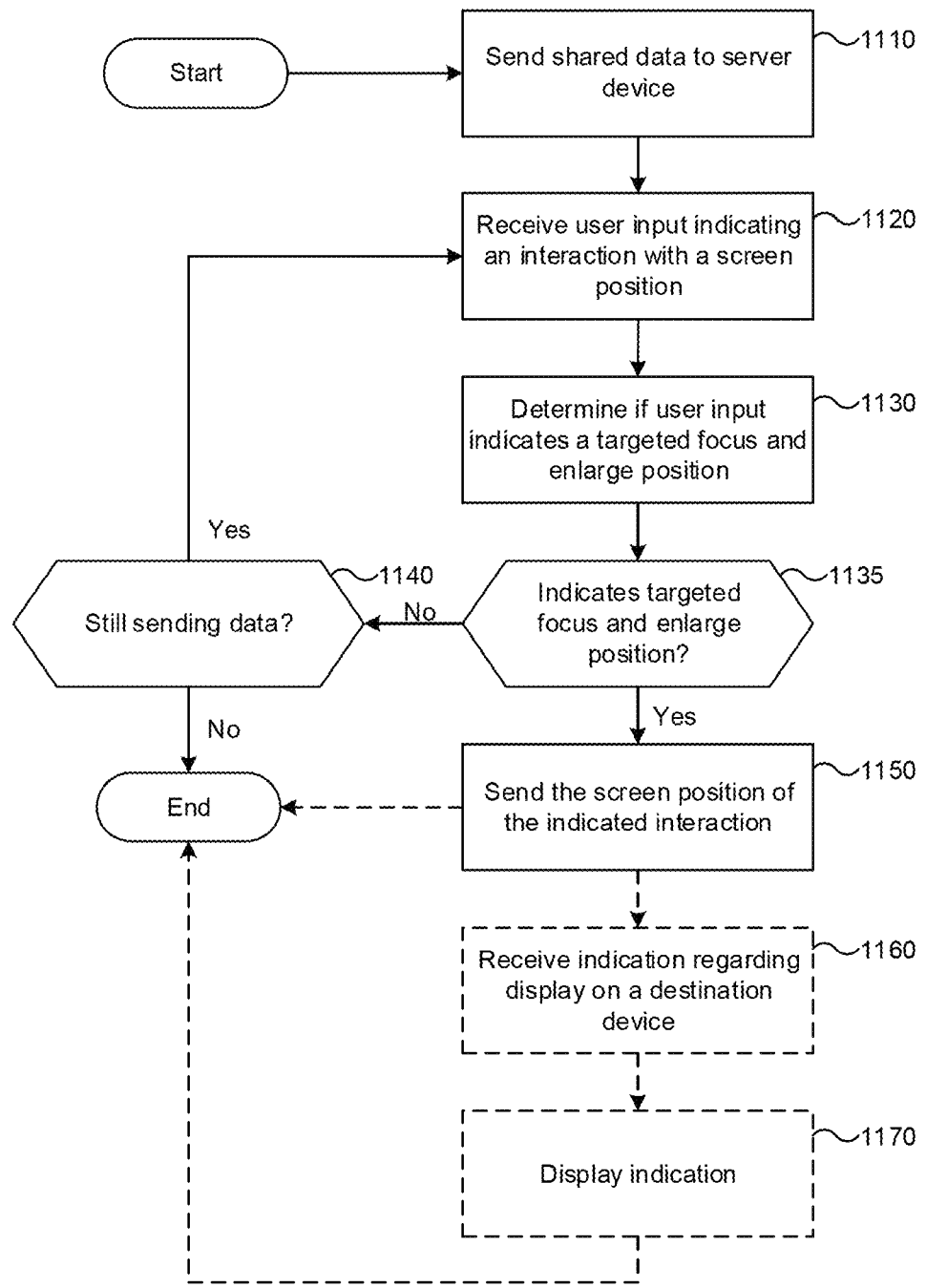
FIG. 11 depicts a flowchart showing an example method for sending data for targeted focus and enlargement of shared content.

FIG. 11 depicts a flowchart showing an example method for sending a data for targeted focus and/or enlargement of shared content in some implementations. The method may be implemented or performed, for example, by one or more of the systems as discussed in connection with FIGS. 1-5. The method may be implemented or performed, for example, by one or more computing devices. The method may be implemented, for example, by a presenter device 504. The steps of the method may be described as being performed by particular components and/or computing devices for the sake of simplicity, but the steps may be performed by any component and/or computing device, or by any combination of one or more components and/or one or more computing devices. The steps of the method may be performed by a single computing device or by multiple computing devices. One or more steps of the method may be omitted, added, rearranged, and/or otherwise modified as desired by a person of ordinary skill in the art.

The steps depicted in FIG. 11 may include sending shared data to a server device (e.g., server device 502) by a computing device (1110). The computing device may be a device as described above. The computing device may receive user input indicating an interaction with a screen position (1120). The computing device may determine if the user input indicates a targeted focus and enlarge position (1130). If the user input does not indicate a targeted focus and enlarge position, the computing device may determine if there is still data being sent (1140). If there is no data being sent anymore, the process may end. If there is still data being sent, the computing device may return to step 1120, receiving user input. If the user input indicates a targeted focus and/or enlarge position, the computing device may send the screen position of the indicated interaction (1150) and the process may end. In some implementations, the computing device may continue on to receive an indication regarding the display of a destination device (e.g., destination device 502) (1160). The computing device may display the indication (1170).

Still referring to FIG. 11 and in more detail, the computing device may send shared data to a server device (1110). In some implementations, shared data is sent as part of an execution of an application (e.g., a virtual conference using one of various software tools). For example, one of the participants of a virtual conference may begin screen sharing and data depicting the contents of a display used by the screen sharer is streamed to the server device. In another example, a particular application is selected by the participant and data depicting the contents of a window containing the application is streamed to the server device. The sharing of the data may be started and ended by the participant. In many software tools, participants may take control to share their screens and/or applications and the remaining participants have their devices become destination devices for the data.

The computing device may receive user input indicating an interaction with a screen position (1120). In some implementations, the received indication may be an interaction that is a selection by a user of a presenter device of a relative position of the displayed content on the presenter device. The selection by the user may be done in a plurality of ways. For example, the user may perform a long click on the position of the display using a mouse, touchpad, touchscreen, or equivalent and the position of the pointer is captured relative to the data being shared. In another example, the user double-clicks or multi-clicks a position of the display using a mouse, touchpad, touchscreen, or equivalent. In a further example, the user clicks and drags a pointer using a mouse, touchpad, touchscreen, or equivalent, and the center of the box bounded by the click and drag is determined to the relative position to be sent. The relative position may be selected using other input devices, such as keyboards, remote controls, virtual reality control devices, and the like.

The computing device may determine if the user input indicates a targeted focus and/or enlarge position (1130). In some implementations, a type of interaction, such as those detailed in step 1120, is associated with an indication to designate a targeted focus and/or enlarge position. When the type of interaction matches the type of interaction associated with the indication to designate a targeted focus and/or enlarge position, the computing device determines the user input indicates a targeted focus and/or enlarge position. For example, the determination may be made that the type of interaction is associated with an indication to designate a targeted focus and/or enlarge position by accessing the type of interaction in a lookup table, a database, and/or otherwise referencing the type of interaction in a data structure associated with types of interactions. The position may be a relative position of shared data.

If the user input does not indicate a targeted focus and/or enlarge position (1135:NO), the computing device may determine if there is still data being sent (1140). For example, the computing device may receive a termination signal or termination event when the data is no longer being streamed. The termination signal or termination event may be a signal that the computing device is no longer sharing data. The termination signal or termination event may be a user input to stop sharing the shared data. In another example, the computing device may detect a signal or indication from another device that the other device is taking over sharing of data. In another example, the computing detects a change in state of the application where the application has changed from a state indicative of sharing of presentation data to a state indicative of not sharing presentation data. If there is no data being sent anymore (1140:NO), the process may end. If there is still data being sent (1140:YES), the computing device may return to step 1120 to continue receiving user input.

If the user input indicates a targeted focus and/or enlarge position (1135:YES), the computing device may send the screen position of the indicated interaction (1150). In some implementations, the relative position is a position on the display of the presenter device depicting the data that is being shared. The position on the display has been interacted with by a user of the presenter device in order to indicate a position that should be target focused and potentially enlarged on a destination device with a potentially smaller display. In some implementations, the position on the display may be an adjusted position of the relative position selected by the user of the presenter device to avoid blank portions of the shared data.

In some implementations, the process may continue and the computing device may receive an indication regarding the display of a destination device (1160). Information such as one or more of screen size, resolution, aspect ratio and other parameters associated with the computer display of the destination device, may form or otherwise be included in indication about the destination device. In some implementations, the information may only be an indication of the type of device using the display to be used to infer an approximate size of the device display. Types of devices may be mobile phones, tablets, laptop computers, desktop computers, and the like. In some implementations, an indication regarding the display of a destination may be data or a simulated view of the data as seen on the destination device. For example, the simulated view is a representation of what is being seen or will be seen by a user of the destination device. In some implementations, the data that is being displayed on the destination device is sent by the destination device to the server device to be further sent to the presenter device.

The computing device may display the indication (1170). In some implementations, the indication may be one or more of screen size, resolution, aspect ratio and other parameters associated with the computer display of a respective destination device. The user of the presenter device may have to select one or more users of destination devices in order to see a display of the indication. In some implementations, the user of the presenter device may select a user of a respective destination device to view a representation of what the user of the respective destination device is seeing (or will see) of the shared data.

Figure 12:
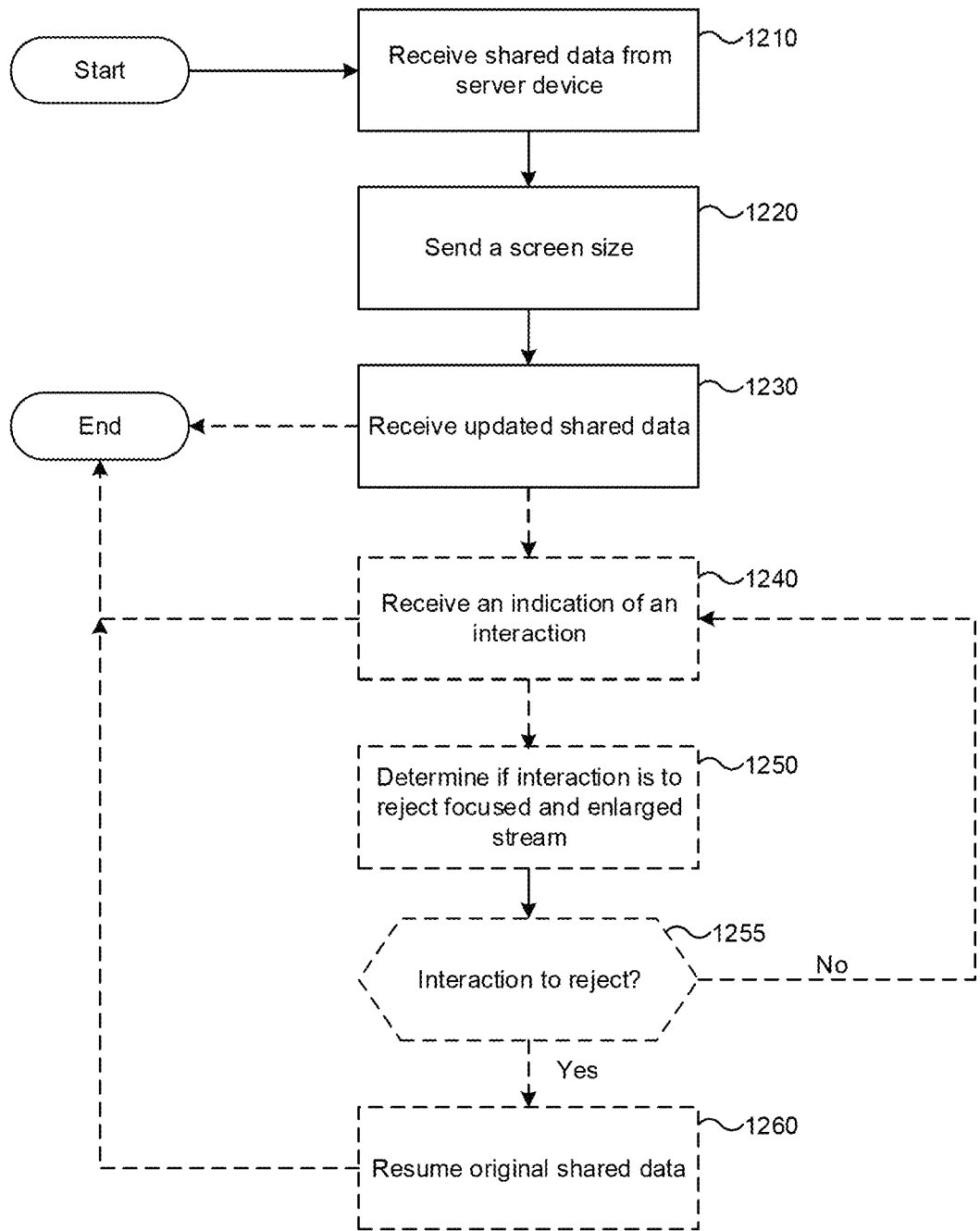
FIG. 12 depicts a flowchart showing an example method for receiving data that uses targeted focus and enlargement.

FIG. 12 depicts a flowchart showing an example method for receiving a data that uses targeted focus and/or enlargement in some implementations. The method may be implemented or performed, for example, by one or more of the systems as discussed in connection with FIGS. 1-5. The method may be implemented or performed, for example, by one or more computing devices. The method may be implemented, for example, by a destination device 502. The steps of the method may be described as being performed by particular components and/or computing devices for the sake of simplicity, but the steps may be performed by any component and/or computing device, or by any combination of one or more components and/or one or more computing devices. The steps of the method may be performed by a single computing device or by multiple computing devices. One or more steps of the method may be omitted, added, rearranged, and/or otherwise modified as desired by a person of ordinary skill in the art.

The steps depicted in FIG. 12 may include receiving a shared data from a server device (e.g., server device 502) by a computing device (1210). The computing device may be a device as described above. The computing device may send a screen size (1220). The computing device may receive an updated shared data (1230). In some implementations, the process may end. In some implementations, the process may continue on to receive an indication of an interaction (1240). The computing device may determine if the interaction is an indication to reject the focused and/or enlarged stream (1250). If the interaction is not to reject the focused and/or enlarged stream, the process may return to step 1240, receiving an indication of an interaction. If the interaction is to reject the focused and/or enlarged data, the computing device may resume the shared data with the original focus and no enlargement (1260).

Still referring to FIG. 12 and in more detail, the computing device may receive a shared data from a server device (1210). In some implementations, the shared data is received already formatted to be display the target focused area with enlarged data. In some implementations, the shared data is received without substantial reformatting. When the shared data is received without substantial reformatting, the computing device may reformat the data before display to correspond to the target focused and enlarged area. For example, the computing device may crop the received data such that only the target focus area is displayed. The computing device may further enlarge the target focus area. The enlarged target focus area may be the full screen of the display of the computing device. In some implementations, the image and/or video data may be enlarged by resizing or increasing the size of the individual pixels. In some implementations, the image and/or video data may be enlarged by resampling or adding additional pixel information. In some examples, enlargement of a portion of the shared data is instead a smaller amount of reduction or no amount of reduction that would otherwise have taken place for that portion of the shared data for the smaller display.

The computing device may send a screen size (1220). In some implementations, the screen size information is sent to a server device. In some implementations, the computing device queries an operating system running on the computing device to obtain information about the display and/or screen of the computing device. In some implementations, the computing device queries the operating system to receive an identifier of the computing device such as an identifier related to a manufacturer, make, and/or model of the computing device. For example, data obtained from the query may be a size of the screen of the computing device in one dimension. For example, the screen size may be the length of the diagonal of the computing device display. In another example, the screen size may be the width of the respective display. In some other implementations, other related display information may be received by the query instead of the screen size information. Other related display information may be one or more of a resolution, aspect ratio and/or other parameters associated with the computer display of the computing device. In some implementations, information obtained in the query may only be an indication of the type of device using the display to be used or the identifier related to a manufacturer, make, and/or model. The indication of the type of device or the identifier may be used by the computing device to infer an approximate size of the display. The indication of the type of device or the identifier may be used by the computing device to lookup the size of the display in a lookup table, database, or other computing data structure referencing the information. In some implementations, the indication of the type of device or the identifier is sent by the computing device instead of the screen size directly. Types of devices may be mobile phones, tablets, laptop computers, desktop computers, and the like.

The computing device may receive an updated shared data (1230). In some implementations, the updated shared data is received already formatted to be display the target focused area with enlarged data based on the sent display information. In some implementations, the updated shared data may need further reformatting. When the updated shared data is received without substantial reformatting, the computing device may further reformat the data before display to correspond to the target focused and enlarged area. For example, the computing device may crop the updated received data such that only the target focus area is displayed. The computing device may further enlarge the target focus area. The enlarged target focus area may be the full screen of the display of the computing device. In some implementations, the image and/or video data may be enlarged by resizing or increasing the size of the individual pixels. In some implementations, the image and/or video data may be enlarged by resampling or adding additional pixel information. In some examples, enlargement of a portion of the shared data is instead a smaller amount of reduction or no amount of reduction that would otherwise have taken place for that portion of the shared data for the smaller display. In some implementations, the process may then end.

In some implementations, the process may continue on to receive an indication of an interaction (1240). In some implementations, the indication of an interaction is from a user of the computing device. The received indication may be an interaction that is a request to revert the targeted focus area and enlargement factor to the original data. In other words, the interaction may be a request to reverse or cancel the changes caused by the enlargement of a section of the data. The selection by the user may be done in a plurality of ways. For example, the user may perform an interaction using a mouse, touchpad, touchscreen, or equivalent and the interaction interacts with an object on the screen to end the enlargement. For example, there may be a button that is indicative of ending the targeted focus and enlargement. In another example, there may be an X that may be clicked to end the targeted focus and enlargement. The cancelation may be selected using other input devices, such as keyboards, remote controls, virtual reality control devices, and the like. For example, the user may hit 'ESC' on the keyboard to end the targeted focus and enlargement. In some implementations, a received indication such as described above is associated with the request to reverse or cancel the changes caused by the enlargement of a section of the data. When the type of interaction matches the type of interaction associated with the indication to reverse or cancel the changes caused by the enlargement of a section of the data, the computing device determines the user input indicates such a desire to reverse or cancel. For example, the determination may be made that the type of interaction is associated with an indication to reverse or cancel the changes caused by the enlargement of a section of the data by accessing the type of interaction in a lookup table, a database, and/or otherwise referencing the type of interaction in a data structure associated with types of interactions.

The computing device may determine if the interaction is an indication to reject or otherwise terminate the focused and/or enlarged data (1250). In some implementations, a type of interaction, such as those detailed in step 1240, is associated with an indication to end the targeted focus and/or enlargement. When the type of interaction matches the type of interaction associated with the indication to end the targeted focus and enlargement, the computing device determines the user input indicates such an intent.

If the interaction is not to reject the focused and/or enlarged stream (1255:NO), the process may return to step 1240, receiving an indication of an interaction. If the interaction is to reject the focused and/or enlarged data (1255: YES), the computing device may resume the shared data with the original focus and no enlargement (1260).

The following paragraphs (M1) through (M7) describe examples of methods that may be implemented in accordance with the present disclosure.

(M1) A method comprising: determining, by a computing device, that a device of a plurality of remote devices includes a display smaller in size than another device of the plurality based on a comparison of display sizes among the plurality of remote devices, the device to receive and display content shared from the another device; receiving, by the computing device, an indication from the another device, the indication identifying relevant portion of content and size in which to display on the device content shared from the another device; adjusting, by the computing device, the content for the another device based on an area of focus and a size as per the indication; and providing, by the computing device, the adjusted content to the device so that the device displays a relevant portion of the content with a size capable of being read by a user of the device.

(M2) A method may be performed as described in paragraph (M1) further comprising, using the indication: calculating a focus point of the content, wherein the focus point is used as a center of the area of focus of the content; calculating a focus area of the content; and calculating an enlargement factor.

(M3) A method may be performed as described in paragraph (M2) further comprising adjusting the focus point of the content to avoid the focus area exceeding a boundary of the content.

(M4) A method may be performed as described in paragraph (M3), wherein the focus point is adjusted by: calculating a boundary window based on the enlargement factor, wherein a center of the boundary window is a center of the displayed version of the content; detecting that the focus point is outside the boundary window; and adjusting the focus point by mapping it to a closest point on the boundary window.

(M5) A method may be performed as described in any of paragraphs (M1) through (M4) further comprising: determining, by a computing device, that a second device of the plurality of remote devices includes a display smaller in size than the another device of the plurality based on a second comparison of display sizes among the plurality of remote devices, the determined second device also to receive and display content shared from the another device, wherein the display size of the second device is different than the display size of the another device; adjusting, by the computing device, the content for the second device based on an area of focus and the size as per the indication; and providing, by the computing device, the adjusted content for the second device to the second device so that the second device displays the relevant portion of the content with a size capable of being read by a user of the second device.

(M6) A method may be performed as described in any of paragraphs (M1) through (M5) further comprising: generating simulated view video data of what is displayed on the device; and sending the simulated view video data to the another device.

(M7) A method may be performed as described in any of paragraphs (M2) through M6) wherein the enlargement factor and the focus area are calculated such that elements displayed on the device are substantially a same size as same elements displayed in an equivalent of the focus area of the device.

The following paragraphs (A1) through (A7) describe examples of computing devices that may be implemented in accordance with the present disclosure.

(A1) A server system comprising: one or more processors; and memory storing instructions that, when executed by the one or more processors, cause the server system to: determine that a device of a plurality of remote devices includes a display smaller in size than another device of the plurality based on a comparison of display sizes among the plurality of remote devices, the determined device to receive and display content shared from the another device; receive an indication from the another device, the indication identifying relevant portion of content and size in which to display on the device content shared from the another device; adjust the content for the another device based on an area of focus and a size as per the indication; and provide the adjusted content to the device so that the device displays a relevant portion of the content with a size capable of being read by a user of the device.

(A2) A server system may be implemented as described in paragraph (A1), the memory further storing instructions that, when executed by the one or more processors, cause the server system to: adjust the focus point of the content to avoid the focus area exceeding a boundary of the content.

(A3) A server system may be implemented as described in paragraph (A2), the memory further storing instructions that, when executed by the one or more processors, cause the server system to: adjust the focus point of the content to avoid the focus area exceeding a boundary of the content.

(A4) A server system may be implemented as described in paragraph (A3), wherein the focus point is adjusted by: calculating a boundary window based on the enlargement factor, wherein a center of the boundary window is a center of the displayed version of the content; detecting that the focus point is outside the boundary window; and adjusting the focus point by mapping it to a closest point on the boundary window.

(A5) A server system may be implemented as described in any of paragraphs (A1) through (A4), the memory further storing instructions that, when executed by the one or more processors, cause the server system to: determine that a second device of the plurality of remote devices includes a display smaller in size than the another device of the plurality based on a second comparison of display sizes among the plurality of remote devices, the determined second device also to receive and display content shared from the another device, wherein the display size of the second device is different than the display size of the another device; adjust the content for the second device based on an area of focus and the size as per the indication; and provide the adjusted content for the second device to the second device so that the second device displays the relevant portion of the content with a size capable of being read by a user of the second device.

(A6) A server system may be implemented as described in any of paragraphs (A1) through (A5), the memory further storing instructions that, when executed by the one or more processors, cause the server system to: generate simulated view video data of what is displayed on the device; and send the simulated view video data to the another device.

(A7) A server system may be implemented as described in any of paragraphs (A1) through (A6), wherein the enlargement factor and the focus area are calculated such that elements displayed on the device are substantially a same size as same elements displayed in an equivalent of the focus area of the device.

The following paragraphs (CRM1) through (CRM6) describe examples of computer-readable media that may be implemented in accordance with the present disclosure.

(CRM1) A non-transitory computer-readable medium storing instructions that, when executed, cause a computing device to: determine that a device of a plurality of remote devices includes a display smaller in size than another device of the plurality based on a comparison of display sizes among the plurality of remote devices, the determined device to receive and display content shared from the another device; receive an indication from the another device, the indication identifying relevant portion of content and size in which to display on the device content shared from the another device; adjust the content for the another device based on an area of focus and a size as per the indication; and provide the adjusted content to the device so that the device displays a relevant portion of the content with a size capable of being read by a user of the device.

(CRM2) A non-transitory computer-readable medium may be implemented as described in paragraph (CRM1), further storing instructions that, when executed, cause the computing device to: calculate a focus point of the content, wherein the focus point is used as a center of the area of focus of the content; calculate a focus area of the content; and calculate an enlargement factor.

(CRM3) A non-transitory computer-readable medium may be implemented as described in paragraph (CRM2), further storing instructions that, when executed, cause the computing device to: adjust the focus point of the content to avoid the focus area exceeding a boundary of the content.

(CRM4) A non-transitory computer-readable medium may be implemented as described in paragraph (CRM3), wherein the focus point is adjusted by: calculating a boundary window based on the enlargement factor, wherein a center of the boundary window is a center of the displayed version of the content; detecting that the focus point is outside the boundary window; and adjusting the focus point by mapping it to a closest point on the boundary window.

(CRM5) A non-transitory computer-readable medium may be implemented as described in any of paragraphs (CRM1) through (CRM4), further storing instructions that, when executed, cause the computing device to: determine that a second device of the plurality of remote devices includes a display smaller in size than the another device of the plurality based on a second comparison of display sizes among the plurality of remote devices, the determined second device also to receive and display content shared from the another device, wherein the display size of the second device is different than the display size of the another device; adjust the content for the second device based on an area of focus and the size as per the indication; and provide the adjusted content for the second device to the second device so that the second device displays the relevant portion of the content with a size capable of being read by a user of the second device.

(CRM6) A non-transitory computer-readable medium may be implemented as described in any of paragraphs (CRM1) through (CRM5), further storing instructions that, when executed, cause the computing device to: generate simulated view video data of what is displayed on the device; and send the simulated view video data to the another device.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   determining, by a computing device, that a device of a plurality of remote devices includes a display smaller in size than another device of the plurality based on a comparison of display sizes among the plurality of remote devices, the device to receive and display content shared from the another device;
   receiving, by the computing device, an indication from the another device, the indication identifying relevant portion of content and size in which to display on the device content shared from the another device;
   adjusting, by the computing device, the content for the another device based on an area of focus and a size as per the indication;
   using the indication to:
      calculate a focus point of the content. wherein the focus point is used as a center of the area of focus of the content:
      calculate a focus area of the content; and
      calculate an enlargement factor:
   adjusting the focus point of the content to avoid the focus area exceeding a boundary of the content; and
   providing, by the computing device, the adjusted content to the device so that the device displays a relevant portion of the content with a size capable of being read by a user of the device;
   wherein the focus point is adjusted by:
      calculating a boundary window based on the enlargement factor. wherein a center of the boundary window is a center of the displayed version of the content:
      detecting that the focus point is outside the boundary window; and
      adjusting the focus point by mapping it to a closest point on the boundary window.

2. The method of claim 1, further comprising:
   determining, by a computing device, that a second device of the plurality of remote devices includes a display smaller in size than the another device of the plurality based on a second comparison of display sizes among the plurality of remote devices, the determined second device also to receive and display content shared from the another device, wherein the display size of the second device is different than the display size of the another device;
   adjusting, by the computing device, the content for the second device based on an area of focus and the size as per the indication; and
   providing, by the computing device, the adjusted content for the second device to the second device so that the second device displays the relevant portion of the content with a size capable of being read by a user of the second device.

3. The method of claim 1, further comprising:
   generating simulated view video data of what is displayed on the device; and
   sending the simulated view video data to the another device.

4. The method of claim 1, wherein the enlargement factor and the focus area are calculated such that elements displayed on the device are substantially a same size as same elements displayed on the another device.

5. A server system comprising:
   one or more processors; and
   memory storing instructions that, when executed by the one or more processors, cause the server system to:
   determine that a device of a plurality of remote devices includes a display smaller in size than another device of the plurality based on a comparison of display sizes among the plurality of remote devices, the determined device to receive and display content shared from the another device;
   receive an indication from the another device, the indication identifying relevant portion of content and size in which to display on the device content shared from the another device;
   adjust the content for the another device based on an area of focus and a size as per the indication;
   calculate a focus point of the content. wherein the focus point is used as a center of the area of focus of the content:
   calculate a focus area of the content;
   calculate an enlargement factor;
   adjust the focus point of the content to avoid the focus area exceeding a boundary of the content: and
   provide the adjusted content to the device so that the device displays a relevant portion of the content with a size capable of being read by a user of the device;
   wherein the focus point is adjusted by:
      calculating a boundary window based on the enlargement factor, wherein a center of the boundary window is a center of the displayed version of the content;
      detecting that the focus point is outside the boundary window; and
      adjusting the focus point by mapping it to a closest point on the boundary window.

6. The server system of claim 5, the memory further storing instructions that, when executed by the one or more processors, cause the server system to:
   determine that a second device of the plurality of remote devices includes a display smaller in size than the another device of the plurality based on a second comparison of display sizes among the plurality of remote devices, the determined second device also to receive and display content shared from the another device, wherein the display size of the second device is different than the display size of the another device;
   adjust the content for the second device based on an area of focus and the size as per the indication; and
   provide the adjusted content for the second device to the second device so that the second device displays the relevant portion of the content with a size capable of being read by a user of the second device.

7. The server system of claim 5, the memory further storing instructions that, when executed by the one or more processors, cause the server system to:
   generate simulated view video data of what is displayed on the device; and
   send the simulated view video data to the another device.

8. The server system of claim 5, wherein the enlargement factor and the focus area are calculated such that elements displayed on the device are substantially a same size as same elements displayed on the another device.

9. One or more non-transitory computer-readable media storing instructions that, when executed, cause a computing device to:
   determine that a device of a plurality of remote devices includes a display smaller in size than another device of the plurality based on a comparison of display sizes among the plurality of remote devices, the determined device to receive and display content shared from the another device;

receive an indication from the another device, the indication identifying relevant portion of content and size in which to display on the device content shared from the another device;

adjust the content for the another device based on an area of focus and a size as per the indication;

calculate a focus point of the content. wherein the focus point is used as a center of the area of focus of the content;

calculate a focus area of the content; and calculate an enlargement factor:

adjust the focus point of the content to avoid the focus area exceeding a boundary of the content: and provide the adjusted content to the device so that the device displays a relevant portion of the content with a size capable of being read by a user of the device;

wherein the focus point is adjusted by:

calculating a boundary window based on the enlargement factor. wherein a center of the boundary window is a center of the displayed version of the content;

detecting that the focus point is outside the boundary window; and adjusting the focus point by mapping it to a closest point on the boundary window.

10. The one or more non-transitory computer-readable media of claim 9, further storing instructions that, when executed, cause the computing device to:

determine that a second device of the plurality of remote devices includes a display smaller in size than the another device of the plurality based on a second comparison of display sizes among the plurality of remote devices, the determined second device also to receive and display content shared from the another device, wherein the display size of the second device is different than the display size of the another device;

adjust the content for the second device based on an area of focus and the size as per the indication; and provide the adjusted content for the second device to the second device so that the second device displays the relevant portion of the content with a size capable of being read by a user of the second device.

11. The one or more non-transitory computer-readable media of claim 9, further storing instructions that, when executed, cause the computing device to:

generate simulated view video data of what is displayed on the device; and send the simulated view video data to the another device.

\* \* \* \* \*